US010834687B2

(12) United States Patent
Hosseini et al.

(10) Patent No.: US 10,834,687 B2
(45) Date of Patent: Nov. 10, 2020

(54) POWER HEADROOM REPORTING FOR SYSTEMS WITH MULTIPLE TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/818,288

(22) Filed: Nov. 20, 2017

(65) Prior Publication Data

US 2018/0146440 A1 May 24, 2018

Related U.S. Application Data

(60) Provisional application No. 62/425,056, filed on Nov. 21, 2016.

(51) Int. Cl.
*H04W 52/36* (2009.01)
*H04W 72/04* (2009.01)
*H04W 72/12* (2009.01)

(52) U.S. Cl.
CPC ..... *H04W 52/365* (2013.01); *H04W 72/0413* (2013.01); *H04W 72/12* (2013.01)

(58) Field of Classification Search
CPC ........... H04W 52/365; H04W 72/0413; H04W 72/12

(Continued)

(56) References Cited

U.S. PATENT DOCUMENTS 9,078,264 B2 * 7/2015 Han ..................... H04W 52/365
9,749,970 B2   8/2017 Vajapeyam et al.
(Continued)

FOREIGN PATENT DOCUMENTS

WO   WO-2016002393 A1   1/2016
WO   WO-2016053844 A1   4/2016
WO    WO2017035464 A1   3/2017

OTHER PUBLICATIONS

CATT: "MAC Impact of Short TTI", 3GPP Draft; R2-167965, 3rd generation Partnership project (3GPP), Mobile Competence Centre: 658, Route Des Lucioles; F-86921, Sophia-Antipolis Cedex; France, vol. RAN WG2, No. Reno, USA; Nov. 13, 2016 (Nov. 13, 2016), pp. 1-4, XP051177693, Retrieved from the Internet: URL:http://www.3gpp.org/ftp/Meetings_3GPP_SYNC/RAN2/Docs/.

(Continued)

*Primary Examiner* — Stephen J Clawson
(74) *Attorney, Agent, or Firm* — Holland & Hart LLP

(57) ABSTRACT

Methods, systems, and devices for wireless communication are described. Separate or combined transmissions of power headroom reports for transmission time intervals (TTIs) having different durations may be transmitted. For example, a user equipment (UE) may be configured to communicate with TTIs of different durations. The UE may identify a transmission power for a first TTI having a first duration and calculate a power headroom based on a maximum transmission power of a serving cell and the transmission power for the first TTI. The UE may determine a power headroom for another TTI having a different duration (e.g., a duration longer than the first duration) and transmit separate power headroom reports for each TTI duration. Additionally or alternatively, the UE may calculate a power headroom associated with both TTI durations and transmit a joint power headroom report for both TTI durations.

10 Claims, 19 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 10,149,255 | B2* | 12/2018 | Patel | H04W 52/365 |
| 2010/0093386 | A1* | 4/2010 | Damnjanovic | H04W 52/04 |
| | | | | 455/522 |
| 2010/0272091 | A1* | 10/2010 | Fabien | H04W 48/08 |
| | | | | 370/345 |
| 2011/0080838 | A1* | 4/2011 | Larsson | H04W 52/346 |
| | | | | 370/252 |
| 2011/0250918 | A1* | 10/2011 | Jen | H04W 52/08 |
| | | | | 455/509 |
| 2012/0044882 | A1 | 2/2012 | Kim et al. | |
| 2012/0213149 | A1* | 8/2012 | Chakraborty | H04W 52/365 |
| | | | | 370/328 |
| 2013/0044623 | A1* | 2/2013 | Speight | H04B 7/15528 |
| | | | | 370/252 |
| 2013/0064131 | A1* | 3/2013 | Kwon | H04L 5/0007 |
| | | | | 370/252 |
| 2014/0349701 | A1* | 11/2014 | Vajapeyam | H04W 52/32 |
| | | | | 455/522 |
| 2015/0208366 | A1* | 7/2015 | Papasakellariou | |
| | | | | H04W 74/0833 |
| | | | | 370/311 |
| 2016/0128095 | A1 | 5/2016 | Damnjanovic et al. | |
| 2016/0255594 | A1* | 9/2016 | Vajapeyam | H04W 52/346 |
| | | | | 455/522 |
| 2016/0323887 | A1 | 11/2016 | Patel et al. | |
| 2017/0142668 | A1 | 5/2017 | Takeda et al. | |
| 2017/0164296 | A1* | 6/2017 | Nogami | H04W 16/32 |
| 2017/0164298 | A1 | 6/2017 | Ryoo et al. | |
| 2018/0270854 | A1* | 9/2018 | Lee | H04L 1/00 |

OTHER PUBLICATIONS

Ericsson: "Summary of E-mail Discussion [71#57] LTE CA: PHR Reporting", 3GPP Draft, R2-105462, 3rd Generation Partnership Project (3GPP), Mobile Competence Centre; 650, Route Des Lucioles; F-06921, Sophia-Antipolis Cedex; France, vol. RAN WG2, No. Xian, China, Oct. 5, 2010, pp. 1-17, XP050605439.
International Search Report and Written Opinion—PCT/US2017/062858—ISA/EPO—dated May 8, 2018 (170877WO).
Sharp: "Remaining Issues on PHR for eIMTA", 3GPP Draft; R1-140633, 3rd Generation Partnership Project (3GPP), Mobile Competence Centre; 650, Route Des Lucioles; F-06921, Sophia-Antipolis Cedex; France, vol. RAN WG1, No. Prague, Czech Republic; Feb. 9, 2014, pp. 1-4, XP050736158, Retrieved from the Internet: URL:http://www.3gpp.org/ftp/Meetings_3GPP_SYNC/RAN/RAN1/Docs/. . . .
ITRI: "Power Headroom Reporting Issue for sTTI operation," 3GPP TSG RAN WG1 Meeting #87, R1-1612195, Reno, USA, Nov. 14-18, 2016, 2 pgs., XP051176147, 3rd Generation Partnership Project.
ISA/EPO, Partial International Search Report of the International Searching Authority, Int'l. App. No. PCT/US2017/062858, dated Jan. 29, 2018, European Patent Office, Rijswijk, NL, 14 pgs.

\* cited by examiner

POWER HEADROOM REPORTING FOR SYSTEMS WITH MULTIPLE TRANSMISSION TIME INTERVALS

CROSS REFERENCES

The present Application for Patent claims priority to U.S. Provisional Patent Application No. 62/425,056 by Hosseini, et al., entitled "Power Headroom Reporting For Systems With Multiple Transmission Time Intervals," filed Nov. 21, 2016, assigned to the assignee hereof, and is hereby expressly incorporated by reference herein in its entirety.

BACKGROUND

The following relates generally to wireless communication in a system that supports a first transmission time interval (TTI) duration and a second TTI duration that is longer than the first duration, and more specifically to power headroom reporting for systems with multiple TTI durations.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use orthogonal frequency division multiple access (OFDMA) on the downlink, single-carrier frequency division multiple access (SC-FDMA) on the uplink, and multiple-input multiple-output (MIMO) antenna technology.

Wireless communications systems are widely deployed to provide various types of communication content such as voice, video, packet data, messaging, broadcast data, and other signals. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and OFDMA systems, (e.g., a LTE system or a New Radio (NR) system). A wireless multiple-access communications system may include a number of base stations or network access nodes, each simultaneously supporting communication for multiple communication devices, which may be otherwise known as user equipment (UE).

Some wireless systems may enable low latency communications, where wireless devices communicate using TTIs having different durations that allow for reduced time between transmissions. In such cases, a base station may indicate a power configuration for uplink transmissions by a UE over the different TTIs, and the UE, in turn, may provide reporting to the base station based on transmissions complying with the indicated power configuration. But power configurations applied to different TTI durations may present challenges for effective reporting by the UE.

SUMMARY

The described techniques relate to methods, systems, devices, or apparatuses that support power headroom reporting for systems with multiple transmission time interval (TTI) durations. Generally, the described techniques provide for separate or combined transmissions of power headroom reports for TTIs having different durations. For example, a user equipment (UE) may be configured to communicate on one or more cell groups with TTIs of different durations. The UE may identify a transmission power for a first TTI having a first duration (e.g., a one-symbol duration TTI, a two-symbol duration TTI, a one-slot duration TTI, and the like) and calculate a power headroom based on a maximum transmission power of a serving cell and the transmission power for the first TTI. In some cases, the UE may similarly determine a power headroom for another TTI having a different duration (e.g., a duration longer than the first TTI) and transmit separate power headroom reports for each TTI duration. Additionally or alternatively, the UE may calculate the power headroom based on the maximum transmission power, the transmission power of the first TTI, and a transmission power of the other TTI and then transmit the power headroom in a combined report, where the combined report includes the power headroom for both TTI durations. The UE may transmit a report of the power headroom (e.g., a power headroom report (PHR)) on the serving cell, where the PHR may be transmitted using either a physical uplink shared channel (PUSCH) or a short PUSCH (sPUSCH). In some cases, when multiple cell groups are defined (such as with a system that supports carrier aggregation (CA) or dual connectivity (DC)), and the PHR for one group is due, the PHR of another group may be sent as a companion. For instance, when a PHR for a first cell is reported, the PHR of a TTI of either the first duration or the second duration for another cell may be reported.

A method of wireless communication in a system that supports a first TTI duration and a second TTI duration that is longer than the first TTI duration is described. The method may include identifying a first transmission power for a first TTI of the first TTI duration, determining a power headroom based at least in part on a maximum transmission power for a serving cell and the first transmission power for the first TTI, and transmitting a report of the power headroom using at least one of a PUSCH on resources of the serving cell or a sPUSCH on the resources of the serving cell.

An apparatus for wireless communication in a system that supports a first TTI duration and a second TTI duration that is longer than the first TTI duration is described. The apparatus may include means for identifying a first transmission power for a first TTI of the first TTI duration, means for determining a power headroom based at least in part on a maximum transmission power for a serving cell and the first transmission power for the first TTI, and means for and transmitting a report of the power headroom using at least one of a PUSCH on resources of the serving cell or a sPUSCH on the resources of the serving cell.

Another apparatus for wireless communication in a system that supports a first TTI duration and a second TTI duration that is longer than the first TTI duration is described. The apparatus may include a processor, memory in electronic communication with the processor, and instructions stored in the memory. The instructions may be operable to cause the processor to identify a first transmission power for a first TTI of the first TTI duration, determine a power headroom based at least in part on a maximum transmission power for a serving cell and the first transmission power for the first TTI, and transmit a report of the power headroom using at least one of a PUSCH on resources of the serving cell or a sPUSCH on the resources of the serving cell.

A non-transitory computer readable medium for wireless communication in a system that supports a first TTI duration and a second TTI duration that is longer than the first TTI duration is described. The non-transitory computer-readable medium may include instructions operable to cause a processor to identify a first transmission power for a first TTI of the first TTI duration, determine a power headroom based at least in part on a maximum transmission power for a serving cell and the first transmission power for the first TTI, and transmit a report of the power headroom using at least one of a PUSCH on resources of the serving cell or a sPUSCH on the resources of the serving cell.

Some examples of the method, apparatus, and non-transitory computer-readable medium described above may further include processes, features, means, or instructions for identifying a second transmission power for a second TTI having the second TTI duration, wherein the power headroom may be determined based at least in part on the first transmission power for the first TTI and the second transmission power for the second TTI. Some examples of the method, apparatus, and non-transitory computer-readable medium described above may further include processes, features, means, or instructions for transmitting one or more uplink messages comprising at least one of the PUSCH, a physical uplink control channel (PUCCH), the sPUSCH, a short PUCCH (sPUCCH), or any combination thereof.

Some examples of the method, apparatus, and non-transitory computer-readable medium described above may further include processes, features, means, or instructions for receiving a transmit power control (TPC) command in a grant of resources for a set of TTIs of the first TTI duration that overlaps in time with the second TTI of the second TTI duration, wherein the power headroom may be determined based at least in part on the TPC command and the power headroom may be associated with each TTI in the set of TTIs.

Some examples of the method, apparatus, and non-transitory computer-readable medium described above may further include processes, features, means, or instructions for determining that the report of the power headroom is due for the first TTI of the first TTI duration or the second TTI of the second TTI duration, wherein the report of the power headroom may be transmitted based at least in part on the determination that the report is due for the first TTI or the second TTI. Some examples of the method, apparatus, and non-transitory computer-readable medium described above may further include processes, features, means, or instructions for receiving a transmit power control (TPC) command associated with the first TTI of the first TTI duration, wherein the power headroom may be determined based at least in part on the TPC command.

Some examples of the method, apparatus, and non-transitory computer-readable medium described above may further include processes, features, means, or instructions for determining that the report for the power headroom is due for the first TTI of the first TTI duration, wherein the report for the power headroom may be transmitted based at least in part on the determination that the report is due for the first TTI. In some examples of the method, apparatus, and non-transitory computer-readable medium described above, the report for the power headroom may be transmitted based at least in part on the determination that the report is due for the second TTI.

In some examples of the method, apparatus, and non-transitory computer-readable medium described above, a set of TTIs of the first TTI duration overlaps in time with the second TTI, the set of TTIs comprises the first TTI. In some examples of the method, apparatus, and non-transitory computer-readable medium described above, the power headroom may be determined based at least in part on a maximum power headroom or an average power headroom for TTIs of the set of TTIs. In some examples of the method, apparatus, and non-transitory computer-readable medium described above, a set of TTIs of the first TTI duration overlaps in time with the second TTI. In some examples of the method, apparatus, and non-transitory computer-readable medium described above, the first TTI comprises an initial TTI scheduled from the set of TTIs. In some examples of the method, apparatus, and non-transitory computer-readable medium described above, a set of TTIs of the first TTI duration overlaps in time with the second TTI, the set of TTIs comprises the first TTI, and the report of the power headroom comprises a value that indicates an index of the first TTI.

Some examples of the method, apparatus, and non-transitory computer-readable medium described above may further include processes, features, means, or instructions for determining that the report of the power headroom is due for the a TTI of a first component carrier. Some examples of the method, apparatus, and non-transitory computer-readable medium described above may further include processes, features, means, or instructions for determining that an additional report of power headroom is due for a TTI of a second component carrier. Some examples of the method, apparatus, and non-transitory computer-readable medium described above may further include processes, features, means, or instructions for transmitting, on the first component carrier, the report of the power headroom and the additional report of the power headroom.

In some examples of the method, apparatus, and non-transitory computer-readable medium described above, the additional report of the power headroom may be calculated using a virtual mode based at least in part on a grant of resources for the first component carrier. Some examples of the method, apparatus, and non-transitory computer-readable medium described above may further include processes, features, means, or instructions for receiving a radio resource control (RRC) message that configures a set of cell groups that includes the serving cell.

In some examples of the method, apparatus, and non-transitory computer-readable medium described above, the first TTI comprises an initial scheduled TTI of a set of TTIs. In some examples of the method, apparatus, and non-transitory computer-readable medium described above, the power headroom may be based at least in part on a configuration of the set of cell groups and the initial scheduled TTI. In some examples of the method, apparatus, and non-transitory computer-readable medium described above, the first TTI comprises one TTI of a set of TTIs. In some examples of the method, apparatus, and non-transitory computer-readable medium described above, the power headroom may be based at least in part on a configuration of the set of cell groups and comprises a value that indicates an index of the first TTI.

Some examples of the method, apparatus, and non-transitory computer-readable medium described above may further include processes, features, means, or instructions for identifying an indication of a virtual mode associated with power headroom reports for a secondary cell group of the set of cell groups, wherein the first TTI comprises an initial scheduled TTI of a set of TTIs, and wherein the report of the power headroom may be based at least in part on the virtual mode and the initial scheduled TTI. In some examples of the method, apparatus, and non-transitory computer-readable medium described above, the virtual mode comprises a first virtual mode for the first TTI duration or a second virtual mode for the second TTI duration, or both. Some examples of the method, apparatus, and non-transitory computer-readable medium described above may further include processes, features, means, or instructions for identifying a second transmission power for a second TTI of the second TTI duration.

Some examples of the method, apparatus, and non-transitory computer-readable medium described above may further include processes, features, means, or instructions for determining an additional power headroom based at least in part on the maximum transmission power for the serving cell and the second transmission power for the second TTI. Some examples of the method, apparatus, and non-transitory computer-readable medium described above may further include processes, features, means, or instructions for transmitting an additional report of the additional power headroom on the resources of the serving cell.

Some examples of the method, apparatus, and non-transitory computer-readable medium described above may further include processes, features, means, or instructions for transmitting a first uplink message that comprises a sPUCCH or the sPUSCH, or both, during the first TTI. Some examples of the method, apparatus, and non-transitory computer-readable medium described above may further include processes, features, means, or instructions for transmitting a second uplink message that comprises a PUCCH or the PUSCH, or both, during the second TTI.

A method of wireless communication in a system that supports a first TTI duration and a second TTI duration that is longer than the first TTI duration is described. The method may include receiving a report of a power headroom via at least one of a PUSCH on resources of a serving cell or an sPUSCH on the resources of the serving cell, wherein the power headroom may be based at least in part on a maximum transmission power for the serving cell and a first transmission power for a first TTI and determining a resource allocation based at least in part on the report of the power headroom.

An apparatus for wireless communication in a system that supports a first TTI duration and a second TTI duration that is longer than the first TTI duration is described. The apparatus may include means for receiving a report of a power headroom via at least one of a PUSCH on resources of a serving cell or an sPUSCH on the resources of the serving cell, wherein the power headroom is based at least in part on a maximum transmission power for the serving cell and a first transmission power for a first TTI and means for determining a resource allocation based at least in part on the report of the power headroom.

Another apparatus for wireless communication in a system that supports a first TTI duration and a second TTI duration that is longer than the first TTI duration is described. The apparatus may include a processor, memory in electronic communication with the processor, and instructions stored in the memory. The instructions may be operable to cause the processor to receive a report of a power headroom via at least one of a PUSCH on resources of a serving cell or an sPUSCH on the resources of the serving cell, wherein the power headroom may be based at least in part on a maximum transmission power for the serving cell and a first transmission power for a first TTI and determine a resource allocation based at least in part on the report of the power headroom.

A non-transitory computer readable medium for wireless communication in a system that supports a first TTI duration and a second TTI duration that is longer than the first TTI duration is described. The non-transitory computer-readable medium may include instructions operable to cause a processor to receive a report of a power headroom via at least one of a PUSCH on resources of a serving cell or an sPUSCH on the resources of the serving cell, wherein the power headroom may be based at least in part on a maximum transmission power for the serving cell and a first transmission power for a first TTI and determine a resource allocation based at least in part on the report of the power headroom.

In some examples of the method, apparatus, and non-transitory computer-readable medium described above, the power headroom may be based at least in part on the first transmission power for the first TTI and a transmission power for a second TTI having the second TTI duration. Some examples of the method, apparatus, and non-transitory computer-readable medium described above may further include processes, features, means, or instructions for receiving one or more uplink messages comprising at least one of a PUSCH, a PUCCH, an sPUSCH or an sPUCCH, or any combination thereof.

Some examples of the method, apparatus, and non-transitory computer-readable medium described above may further include processes, features, means, or instructions for transmitting a TPC command in a grant of resources for a set of TTIs of the first TTI duration that overlaps in time with the second TTI of the second TTI duration, wherein the power headroom may be based at least in part on the TPC command and the power headroom may be associated with each TTI in the set of TTIs. In some examples of the method, apparatus, and non-transitory computer-readable medium described above, the report of the power headroom is due for the first TTI of the first TTI duration or the second TTI of the second TTI duration. In some examples of the method, apparatus, and non-transitory computer-readable medium described above, the report of the power headroom is received based at least in part on the report being due for the first TTI or the second TTI.

Some examples of the method, apparatus, and non-transitory computer-readable medium described above may further include processes, features, means, or instructions for transmitting a TPC command associated with the first TTI of the first TTI duration, wherein the power headroom may be determined based at least in part on the TPC command. In some examples of the method, apparatus, and non-transitory computer-readable medium described above, the report for the power headroom is due for the first TTI of the first TTI duration. In some examples of the method, apparatus, and non-transitory computer-readable medium described above, the report for the power headroom may be received based at least in part on the report being due for the first TTI.

In some examples of the method, apparatus, and non-transitory computer-readable medium described above, the report for the power headroom is due for the second TTI of the second TTI duration. In some examples of the method, apparatus, and non-transitory computer-readable medium described above, the report for the power headroom may be received based at least in part on the report being due for the second TTI.

DETAILED DESCRIPTION

Figure 1:
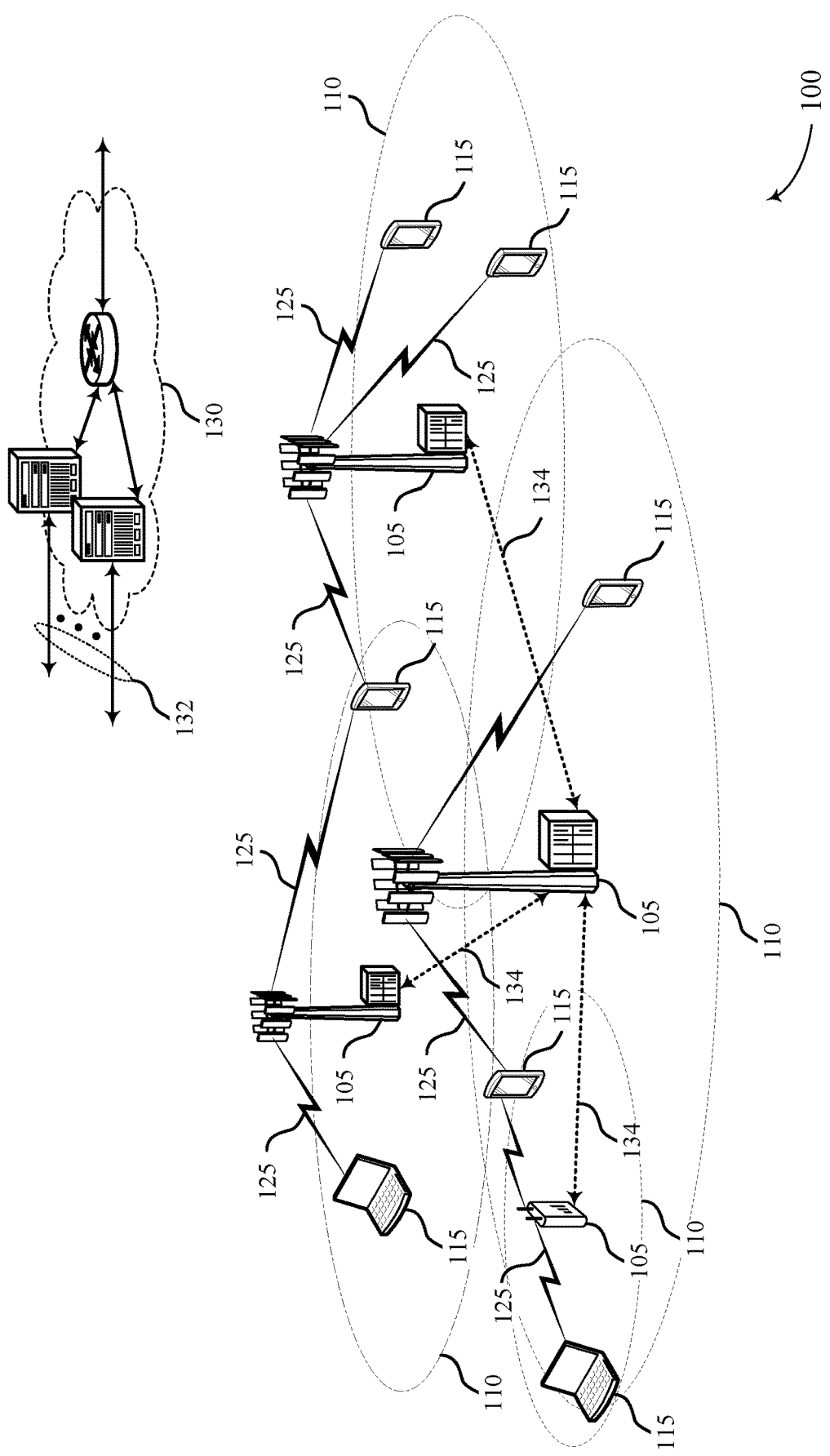
FIG. 1 illustrates an example of a wireless communication system that supports a first transmission time interval (TTI) duration and a second TTI duration that is longer than the first duration, where the system further supports power headroom reporting for systems with multiple TTIs in accordance with aspects of the present disclosure.

Some wireless communications system may implement a number of power management techniques for wireless devices, including supporting separate or combined power headroom reporting for different transmission time interval (TTI) durations in the system. For example, a user equipment (UE) may calculate a power headroom (e.g., an indication of a difference between a maximum transmission power and a transmission power of a current transmission) and transmit a power headroom report (PHR) to a base station. The PHR may reflect power headroom for uplink messages that include control or data, such as a physical uplink control channel (PUCCH) or a physical uplink shared channel (PUSCH), or any combination of these. The PHR may accordingly be used to improve resource allocation for transmissions between the UE and base station. For example, based on a received PHR, a base station may determine whether the bandwidth allocated to a UE may be increased or decreased.

Power headroom reporting may be implemented in systems using TTIs having different durations and transmitted over multiple cell groups. For instance, a base station may send a transmit power control (TPC) command to a UE, where a maximum transmission power may be associated with a number of TTIs having different durations. Accordingly, a PHR associated with the different TTI durations may be used to rapidly update wireless communication services (such as in a system that enables low latency communications). In such cases, the UE may report a power headroom for a TTI having a first TTI duration (e.g., a short TTI (sTTI), such as a one-symbol duration TTI, a two-symbol duration TTI, a one-slot duration TTI, etc.) and a second TTI having a second TTI duration (e.g., a 1 millisecond (ms) duration).

In some examples, a report of a power headroom may be independently managed for TTIs with different durations. That is, a PHR for TTIs of the first TTI duration may be calculated and communicated separately from a PHR for TTIs of the second TTI duration. In such cases, a maximum transmission power may apply to each of the TTIs having different durations. Additionally or alternatively, a PHR for multiple TTIs with different durations may be jointly managed in a single report. For example, a power headroom for a TTI of the first duration and power headroom for a TTI of the second duration may be transmitted in the same PHR to the base station. In some examples, the PHR may be transmitted using different physical channels based on an availability of resources on a serving cell. For instance, the PHR may be transmitted via a PUSCH or a short (PUSCH) sPUSCH on resources of the serving cell, where the use of either the PUSCH or sPUSCH may be based on an availability of uplink resources for a PHR transmission (e.g., in accordance with a received resource grant). When a PHR is due for either TTI duration, the PHR may include information for more than one TTI, with each TTI having a different duration. In such cases, respective TPCs may be associated with one or more TTIs within a set of TTIs, and a combined transmission power for the TTIs of different durations may be compared to the maximum transmission power when calculating the PHR.

Aspects of the disclosure introduced above are described in the context of a wireless communications system. Further examples are then provided that illustrate power headroom reports for different TTI durations. Aspects of the disclosure are further illustrated by and described with reference to apparatus diagrams, system diagrams, and flowcharts that relate to power headroom reporting for systems with multiple TTIs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may be an example of a system that enables efficient power headroom reporting for TTIs with different TTI durations.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105. Various base stations 105 may have different power management constraints, and they may support different TTI durations under such constraints.

Multiple-input multiple-output (MIMO) wireless systems use a transmission scheme between a transmitter (e.g. a base station 105) and a receiver (e.g. a UE 115), where both transmitter and receiver are equipped with multiple antennas. Some portions of wireless communications system 100 may use beamforming. For example, a base station 105 may have an antenna array with a number of rows and columns of antenna ports that the base station 105 may use for beamforming in its communication with a UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs). For example, a short TTI (sTTI) may have a duration of one orthogonal frequency division multiplexing (OFDM) symbol period, two OFDM symbol periods, seven OFDM symbol periods, one LTE slot, or the like. Additionally or alternatively, an sTTI may have another duration that is less than other TTIs used in wireless communications system 100.

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, or the like. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexed (FDD) and time division duplexed (TDD) component carriers. Multiple component carriers may be aggregated or utilized concurrently to provide some UEs 115 with greater bandwidth and, e.g., higher data rates.

A carrier used for downlink may be referred to as a downlink CC, and a carrier used for uplink may be referred to as an uplink CC. A UE 115 may be configured with multiple downlink CCs and one or more uplink CCs for carrier aggregation. Each carrier may be used to transmit control information (e.g., reference signals, control channels, etc.), overhead information, data, or other signals. A UE 115 may communicate with a single base station 105 utilizing multiple carriers, and may also communicate with multiple base stations 105 simultaneously on different carriers. Each cell of a base station 105 may include an uplink CC and a downlink CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). PCells may be semi-statically configured by higher layers (e.g., radio resource control (RRC), etc.) on a per-UE basis. Certain uplink control information (UCI), e.g., acknowledgment/negative acknowledgment (ACK/NACK), channel quality indicator (CQI), and scheduling information transmitted on PUCCH, are carried by the PCell. Additional carriers may be designated as secondary carriers, or secondary component carriers (SCC), which may be served by secondary cells (SCells). SCells may likewise be semi-statically configured on a per-UE basis. In some cases, SCells may not include or be configured to transmit the same control information as the PCell.

A UE 115 may also be connected to more than one base station 105 to achieve carrier aggregation (CA) between different cells (e.g., simultaneous connections to a macro cell and a small cell), which may be referred to as dual connectivity (DC) or inter-site CA. In such cases, a UE 115 may be anchored to a first base station 105 on a first frequency band while throughput may be enhanced through the small cell on a second frequency band. Accordingly, services such as mobility management may be maintained on a macro cell providing robust coverage for the UE 115, while the small cell provides additional capacity for data communication. In some cases, multiple carriers used for DC may be configured within different cell groups, such as a master cell group and a secondary cell group. In some examples, within each cell group, there may be one or more CCs, including a PCC and one or more SCCs.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds (μs)). A TTI in eCC may consist of one or multiple symbols. In some cases, the TTI duration (that is, the number of symbols in a TTI) may be variable.

A physical downlink control channel (PDCCH) may carry downlink control information (DCI) in control channel elements (CCEs), which may consist of nine logically contiguous resource element groups (REGs), where each REG contains four resource elements (REs). DCI includes information regarding downlink scheduling assignments, uplink resource grants, transmission scheme, uplink power control, HARQ information, modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. DCI size and format may depend on the amount of information as well as factors such as bandwidth, the number of antenna ports, and duplexing mode.

A UE 115 may coordinate transmission power with a serving base station 105 to mitigate interference, improve the uplink data rate, and prolong battery life. Uplink power control may include a combination of open-loop and closed-loop mechanisms. In open-loop power control, the UE transmission power may depend on estimates of the downlink path-loss and channel configuration. In closed-loop power control, the UE transmission power may be controlled or adjusted using explicit power-control commands from the network. Open-loop power control may be used for initial access, whereas both open and closed loop control may be used for uplink control and data transmission. A UE 115 may determine power using an algorithm that takes into account a maximum transmission power limit, a target base station receive power, path loss, MCS, the number of resources used for transmission, and the format of the transmitted data (e.g., a PUCCH format). That is, the UE 115 may transmit an indication to the base station 105 regarding an amount of transmission power left for the UE 115 to use in addition to power being used for a current transmission (e.g., a PHR). Power adjustments may be made by a base station 105 using TPC messages, which may incrementally adjust the transmission power of a UE 115, as appropriate.

A UE 115 may calculate power headroom and transmit a PHR to a base station 105 to improve resource allocation for transmissions between the UE 115 and base station 105. The UE 115 may report its power headroom (PH) to the base station 105 as calculated according to the equation:

$$PH = \text{Maximum allowed transmission power} - \text{Estimated desired power} \quad (1)$$

The estimated desired power may be calculated based on the channel on which the UE 115 is operating, and on the UE's current MCS, including, for example, a modulation order and code rate of transmission. A UE 115 may round its power headroom to a closest value (e.g., in steps of 1 dB) in a particular range (e.g., between 40 and −23 dB).

A PHR may help the base station 105 allocate resources for transmissions by UEs 115 and other devices in communication with the base station 105. For example, based on PHR reported values, a base station 105 may determine whether the bandwidth allocated to a UE 115 may be increased or decreased. The PHR may be based on a number of different transmission types. For example, a first transmission type may be associated with a PHR calculated assuming that an uplink message will include a PUSCH transmission without a PUCCH. Alternatively, in a second transmission type, a UE 115 may provide PHR reflecting an uplink message including both PUSCH and PUCCH transmissions. The PHR may further be delivered by the physical layer to a higher layer.

Power headroom in wireless communications system 100 may be reported for CA and DC. For example, if a UE 115 is operating under a secondary cell group, a PHR configuration may indicate that a virtual mode be used. In such a case, the UE 115 may compute a power headroom using a virtual PHR, where the UE 115 assumes PUSCH or PUCCH are not transmitted on any serving cell of the secondary cell group. In such cases, the PH of other cell groups may be computed based on a history of the cell group or based on other parameters, such as a closed-loop power parameter $f_c$. When multiple cell groups (or multiple CCs) are defined, and the PHR for one group is due, the PHR of another group may be sent as a companion. For example, the PHR of a first cell group may be sent as a companion to the PHR of a second cell group, which may be done assuming actual transmissions or in the virtual mode.

Wireless communications system 100 may support separate (e.g., independent) or combined transmissions of power headroom reports for TTIs having different durations. For example, a UE 115 may be configured to communicate on one or more cell groups with TTIs of different durations. The UE may identify a transmission power for a first TTI having a first duration (e.g., an sTTI) and calculate a power headroom based on a maximum transmission power of a serving cell and the transmission power for the first TTI. In some cases, the UE 115 may similarly determine a power headroom for another TTI having a different duration and transmit separate power headroom reports for each TTI duration. Additionally or alternatively, the UE 115 may calculate the power headroom based on the maximum transmission power, the transmission power of the first TTI, and a transmission power of the other TTI and then transmit the power headroom in a combined report, where the combined report includes the power headroom for both TTI durations. The UE may transmit a report of the power headroom (e.g., the PHR) on the serving cell, where the PHR may be transmitted using either a PUSCH or a sPUSCH.

Figure 2:
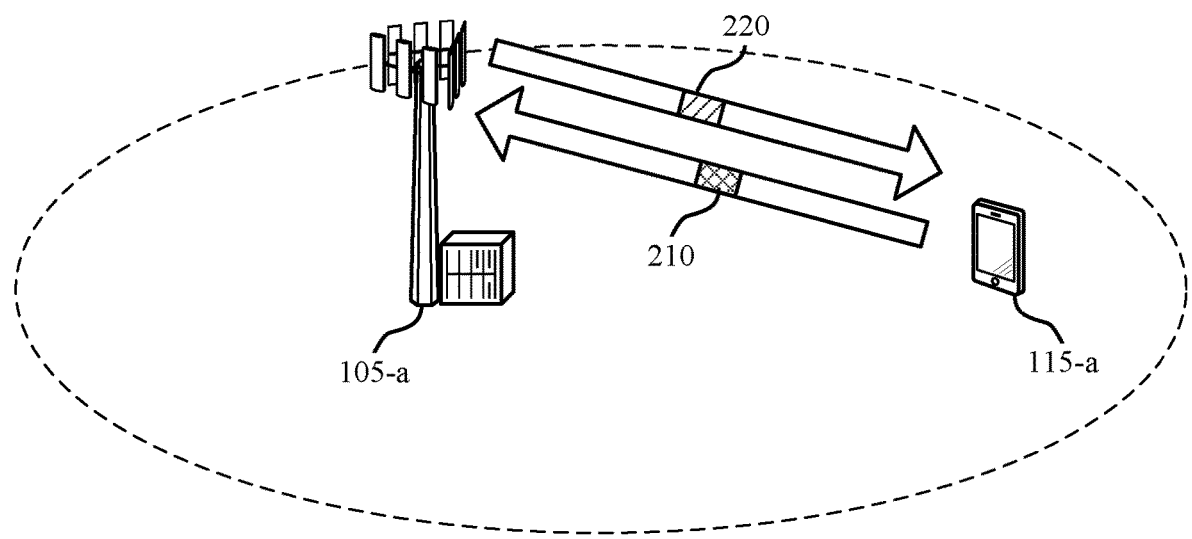
FIG. 2 illustrates an example of a wireless communications system that supports power headroom reporting for systems with multiple TTIs in accordance with aspects of the present disclosure.

FIG. 2 illustrates an example of a wireless communications system 200 that supports power headroom reporting for systems with multiple TTIs. Wireless communications system 200 may include a base station 105-a and UE 115-a, which may be examples of the corresponding devices as described with reference to FIG. 1. Wireless communications system 200 may be an example of a system that supports reporting power headroom for multiple TTIs with different durations.

In wireless communications system 200, UE 115-a may calculate a power headroom and transmit, in an uplink transmission, a PHR 210 to base station 105-a to improve resource allocation for transmissions between UE 115-a and base station 105-a. PHR 210 may be associated with TTIs with different durations, which may enable low latency communications in wireless communications system 200. For instance, when configured for low latency operation, UE 115-a may report a power headroom for a TTI having a first TTI duration (e.g., an sTTI) and a second TTI having a second TTI duration (e.g., a 1 ms duration or a subframe) in an uplink subframe. In some cases, each of the cells within wireless communications system 200 (e.g., a serving cell or a secondary cell in a CA system), may support the power headroom reporting of both the first and second TTI durations.

In some examples, base station 105-a may communicate a TPC command 220 to UE 115-a in an uplink grant included in a PDCCH. Each TTI may have its own TPC that is communicated in an uplink grant from base station 105-a. Thus, the transmission power may vary one or more times over the duration of a TTI (e.g., a subframe). Therefore, it may be desirable to have a method of reporting power headroom in systems using multiple TTI durations in single-cell and carrier aggregation wireless communication systems. Such a system, may, for example, result in or allow for low latency communication.

Various methods of power headroom reporting may be performed for TTIs of different durations, including cases where uplink transmission power is independent and jointly managed. For instance, uplink power control may be independently managed between TTIs of the first TTI duration and second TTI duration. In this case, power headroom reporting may be performed for each TTI duration independently. PHR 210 for the TTIs of the second TTI duration (e.g., a 1 ms TTI duration) may be reported in accordance with a first type of reporting with PHR 210 reflecting a PUSCH transmission without a PUCCH transmission, or a second type of reporting with PHR 210 reflecting a transmission with both PUSCH and PUCCH. For TTIs of the first TTI duration (e.g., sTTIs), a third type of reporting may be used which includes a PHR 210 reflecting an sPUSCH transmission, or reflecting a combined sPUSCH and shortened (or short) PUCCH (sPUCCH) transmission.

In some examples, uplink power control for both TTIs of the first TTI duration and second TTI duration may be managed jointly with a single TPC command 220. In this case, a variety of power headroom reporting methods may be used. For example, PHR 210 may be reported using a number of PHR types, including a PHR assuming a transmission of a PUCCH, a PUSCH, an sPUCCH, an sPUSCH, or any combination thereof. In some examples, a power headroom expression may be derived for each PHR type.

For TPC jointly controlling TTIs of different durations, PHR methods may be used with shortened TPC (sTPC), where the sTPC may change at TTI or subframe boundaries. sTPC may be used to modulate uplink transmission power for each TTI. sTPC may change at the boundaries of subframes, and thus sTPC commands may be the same for each of the TTIs within a subframe whether the TTIs are of the first TTI duration or the second TTI duration. For TTIs of the first duration, power headroom may be the same from one TTI to another TTI within a subframe. In this case, when PHR 210 is due to be reported for a TTI of either the first TTI duration or the second TTI duration, UE 115-a may report the power headroom of the TTIs having the second duration added to the power headroom of the TTIs having the first duration.

PHR methods for multiple TTI durations may further be used with sTPC that may change at each TTI. sTPC may change from one TTI to another within a subframe, for example, from one sTTI to another sTTI within a 1 ms subframe. In such cases, PHR 210 may be jointly reported for both the TTIs of the first TTI duration and the TTIs of the second TTI duration. When PHR 210 for TTIs of the first TTI duration is due to be reported, the power headroom may be calculated to be the power headroom for the TTIs of the first duration added to the power headroom of the TTIs of the second duration. When PHR 210 for the TTIs of the second TTI duration is due to be reported, the power headroom may be reported as the average or the maximum power headroom of the all the TTIs of the first TTI duration within the subframe plus the power headroom of the TTI having the second TTI duration.

In some cases, when PHR 210 for the TTIs of the second TTI duration is due to be reported, the power headroom may be reported as the power headroom of the first TTI within the subframe with the first TTI duration, plus the power headroom of the TTI having the second TTI duration. Additionally or alternatively, when PHR 210 for the TTIs of the second TTI duration is due to be reported, the power headroom may be reported as the power headroom of any of the TTIs having the first TTI duration within the subframe, plus an index for the corresponding TTI, plus the power headroom of the TTI having the second TTI duration.

Further power headroom reporting methods may be defined, including a virtual PHR mode, for power headroom reporting in CA and DC communications systems. That is, UE 115-*a* may operate using multiple cells, and the power headroom of only a single cell may be due. In such cases, the methods of power headroom reporting for single cell reporting as discussed above may be used. When operating in accordance with a companion mode for CA or DC configurations, a virtual PHR mode may be configured for transmitting a virtual PHR 210. However, in some cases where the virtual PHR mode is not configured, UE 115-*a* may report power headroom including a power headroom of the TTI having the second TTI duration plus the power headroom of the first scheduled TTI with the first TTI duration.

In some cases, the virtual PHR may be used in other scenarios different from CA and/or DC. For example, whenever a PHR of a CC is due and there is no uplink resource grant, UE 115-*a* may compute the PHR using one or more predetermined parameters, which may correspond to the use of the virtual PHR. In CA and DC cases, when the PHR of multiple CCs may be due, a first CC may have a set of available uplink resources according to a received resource grant, but a second CC may not be assigned resources. As a result, for the second CC, a virtual PHR for the second CC may be reported using a PHR for the first CC having an uplink grant. In other words, if a PHR for two different CCs are due, the PHR of the first CC and the second CC may be sent on a single CC. In such cases, if both PHRs are due, and one CC has no granted resources, the PHR for that CC may be computed in a virtual mode.

Multiple PHRs may not only be associated with different CCs, but may also be associated with different TTI lengths. That is, the PHRs may be reported for any combination of TTIs having the first TTI duration or the second TTI duration and for different CCs. For instance, a PHR for the first CC may be reported for a TTI having the first TTI duration, whereas the PHR for the second CC (that is transmitted along with the PHR for the first CC) may be reported for a second TTI having the second TTI duration or for the second TTI having the first TTI duration.

Additionally or alternatively, UE 115-*a* may report the power headroom using the power headroom of the TTI having the second TTI duration, plus the power headroom of any of the scheduled TTIs with the first TTI duration and the index of the corresponding TTI. In other cases, where the virtual PHR mode is configured, UE 115-*a* may report a virtual power headroom as the power headroom of the TTI having the second TTI duration plus the power headroom of the first instance of a TTI with the first TTI duration. For virtual TTIs, power headroom reporting may be performed in accordance with any of the methods previously described. Additionally or alternatively, a TTI formulation may be implemented for the virtual TTIs having the first TTI duration.

Figure 3:
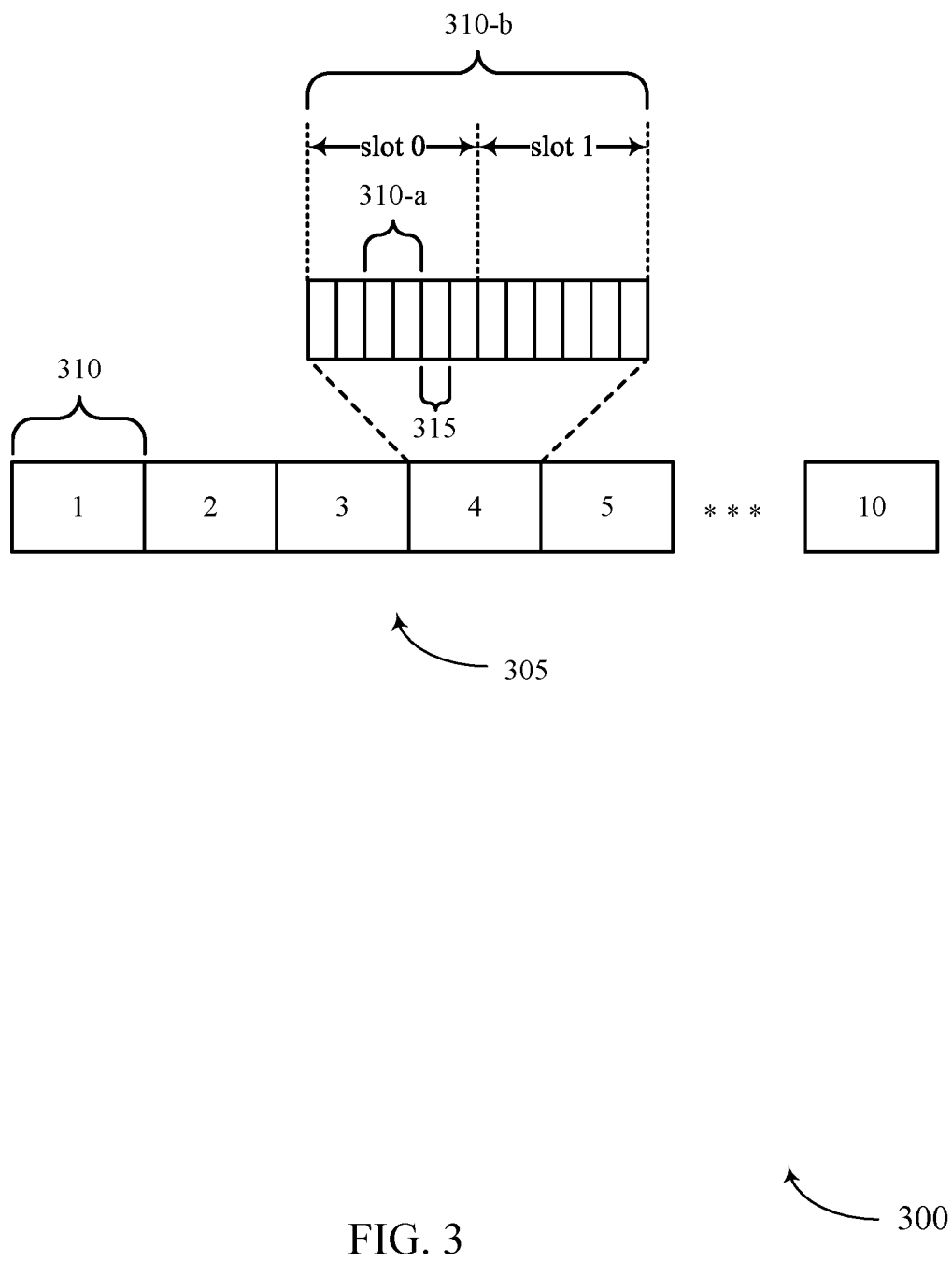
FIG. 3 illustrates an example of a TTI configuration that supports power headroom reporting for systems with multiple TTIs in accordance with aspects of the present disclosure.

FIG. 3 illustrates an example of a TTI configuration 300 that supports power headroom reporting for systems with multiple TTIs. TTI configuration 300 may be an example of a frame 305 that includes multiple TTIs 310 having different TTI durations, where a power headroom for each TTI duration is managed independently or jointly. For example, a PHR may be transmitted by a UE 115 for TTIs 310 of different durations, as illustrated in TTI configuration 300.

TTI configuration 300 may include frame 305 that includes a number of TTIs 310 that are used for communication between a UE 115 and a base station 105. Frame 305 may include ten TTIs, but other numbers of TTIs are also contemplated. For example, frame 305 may include a number of TTIs 310 that are used for downlink transmissions from a base station 105 and uplink transmissions from a UE 115. Frame 305 may represent time domain allocations over a number of different subcarriers or tones that are used for uplink and downlink communications. Frame 305 may, for example, include a first TTI 310-*a* having a first TTI duration (e.g., an sTTI) and a second TTI 310-*b* having a second TTI duration (e.g., a 1 ms TTI). In some cases, a TTI 310 may comprise two slots (e.g., slot 0 and slot 1). Second TTI 310-*b* may further include a set of first TTIs 310-*a* that overlap in time with second TTI 310-*b*. That is, each of first TTIs 310-*a* may include, for example, one-symbol duration 315, and each second TTI 310-*b* may accordingly include six overlapping first TTIs 310-*a*. TTIs 310-*a* (or 315) and TTIs 310 may represent different time domain allocations of the same frequency resources (e.g., subcarriers) or may represent overlapping time domain allocations of different frequency resources. In some cases, TTIs 310 may be transmitted using different spatial layers.

In some examples, a serving cell or a secondary cell may support power headroom reporting of both first TTIs 310-*a* having the first TTI duration and second TTIs 310-*b* having the second TTI duration. For example, in frame 305, a UE 115 may report a power headroom for both a TTI 310 with the second duration and a power headroom for each first TTI 310-*a*. In some cases, each TTI 310 may have its own TPC communicated from a base station 105. Thus, the transmission power may vary from one TTI 310 to the next.

The TPC from the base station 105 may be independently managed between first TTIs 310-*a* of the first TTI duration and second TTIs 310-*b* of the second TTI duration. In this case, a PHR may be associated with each TTI 310 independently. Alternatively, power control for first TTIs 310-*a* and second TTIs 310-*b* may be managed jointly with a singular TPC command. For TPC jointly controlling TTIs 310 of different durations, sTPC may change at the boundaries of TTIs 310 (e.g., subframe boundaries). In some cases, an sTPC may be used to modulate uplink transmission power for each TTI 310, and sTPC may thus change at the boundaries of TTIs 310 (e.g., each subframe boundary). A received sTPC command may be the same for each first TTI 310-*a* and second TTI 310-*b* within a particular subframe. Thus, for first TTIs 310-*a*, power headroom may be the same from one TTI 310-*a* to another.

Alternatively, sTPC may change from one first TTI 310-*a* to another within a particular subframe. For example, sTPC may change from one sTTI length first TTI 310-*a* to the next sTTI length first TTI 310-*a* within a 1 ms duration second TTI 310-*b* (e.g., within one subframe). In this case, power headroom for the TTIs 310 may be jointly reported for both first TTIs 310-*a* and second TTIs 310-*b*.

Figure 4:
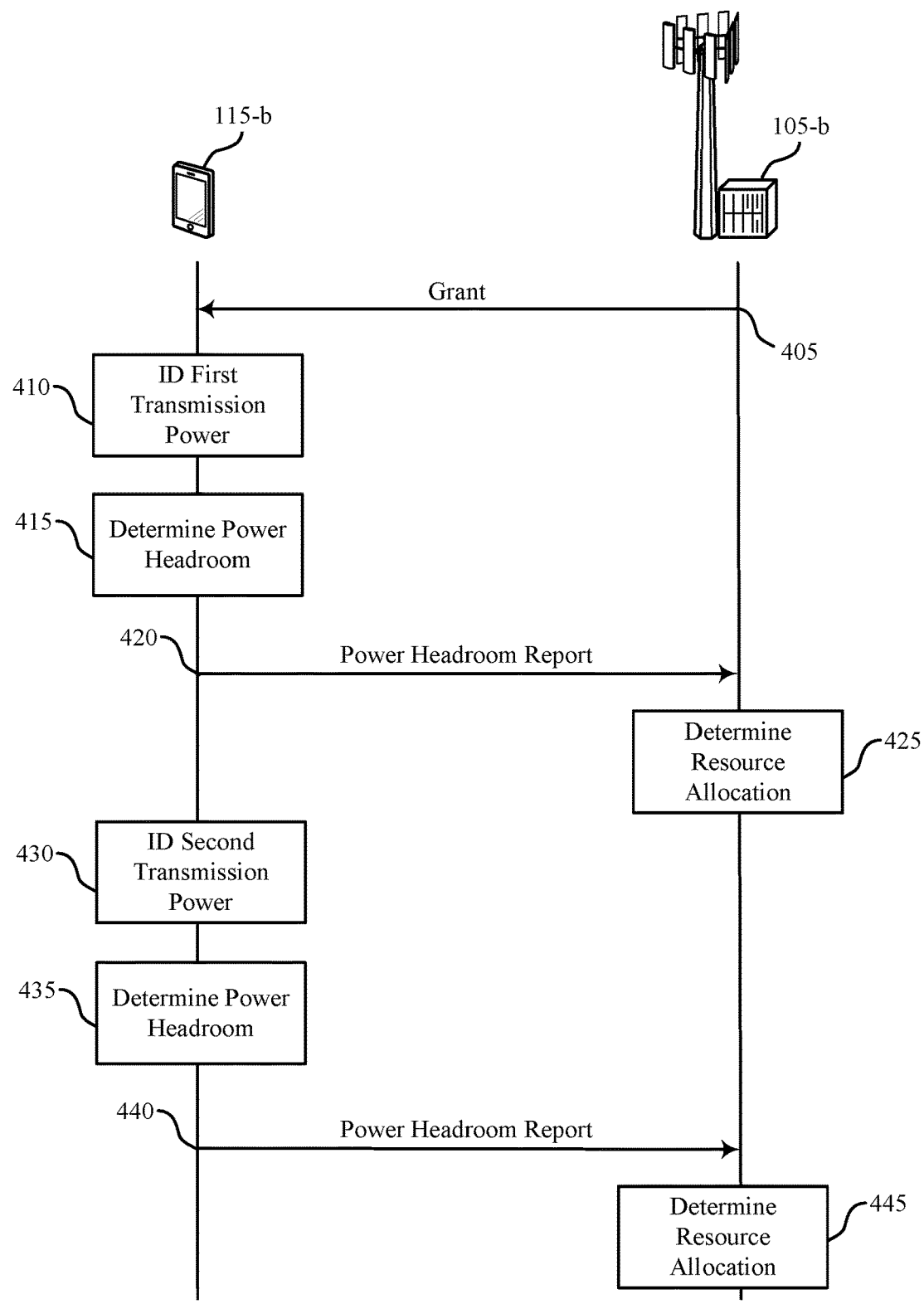
FIGS. 4 and 5 illustrate examples of process flows in a system that support power headroom reporting for systems with multiple TTIs in accordance with aspects of the present disclosure.

FIG. 4 illustrates an example of a process flow 400 that supports power headroom reporting for systems with multiple TTIs. Process flow 400 may include a base station 105-*b* and UE 115-*b*, which may be examples of the corresponding devices as described with reference to FIGS. 1 and 2. UE 115-*b* and base station 105-*b* may each communicate using multiple TTIs, where the TTIs have different durations (e.g., a two-symbol TTI and a 1 ms TTI). Process flow 400 may be an example of a system where power headroom is independently reported for TTIs with different durations.

At 405, base station 105-*b* may transmit, and UE 115-*b* may receive, a grant of resources for a set of TTIs. For example, the grant of resources may include time-frequency resources that UE 115-*b* may use for the transmission of uplink data or signaling via a PUSCH or an sPUSCH. In some examples, the grant may include a TPC command for a number of TTIs, which may include a first TTI with a first TTI duration and a second TTI with a second TTI duration. At 410, UE 115-*b* may identify a first transmission power. The first transmission power may correspond to the first TTI, where the first TTI has the first TTI duration (e.g., a sTTI).

At 415, UE 115-*b* may determine a power headroom. In some cases, determining the power headroom may be based on a maximum transmission power for a serving cell and the identified first transmission power for TTIs of the first TTI duration. Determining the power headroom may further be based on, for example, an estimated desired power, which may be calculated based on the channel on which UE 115-*b* operates, and on a MCS of UE 115-*b*. When calculating the power headroom for the first TTI, UE 115-*b* may assume a transmission of a second uplink message that may include an sPUCCH or an sPUSCH, or both.

At 420, UE 115-*b* may transmit, and base station 105-*b* may receive, a PHR. The PHR may be transmitted on resources indicated by the grant of resources received at 405. For instance, the grant of resources received at 405 may indicate a set of resources that UE 115-*b* may use to transmit the PHR using, for example, either a PUSCH or an sPUSCH. In some examples, UE 115-*b* may further transmit to base station 105-*b* a first uplink message during the first TTI. The first uplink message may, for example, include the sPUCCH and the sPUSCH or may include the sPUSCH without the sPUCCH.

At 425, base station 105-*b* may determine a resource allocation for UE 115-*b*. The first resource allocation may allocate available resources among UE 115-*b*, other UEs 115, and other devices in communication with base station 105-*b*. Based on values received in the PHR, base station 105-*b* may determine, for example, that the bandwidth allocated to UE 115-*b* may be increased or decreased. At 430, UE 115-*b* may identify a second transmission power. The second transmission power may correspond to a second TTI, where the second TTI has a second TTI duration (e.g., a 1 ms TTI). The second TTI duration may, for example, be a longer duration than the first TTI duration.

At 435, UE 115-*b* may accordingly determine an additional power headroom. Determining the additional power headroom may be based on a maximum transmission power for the serving cell and the identified second transmission power for TTIs of the second TTI duration. Determining the additional power headroom may further be based on additional values for an estimated desired power, which may be calculated based on the channel on which UE 115-*b* is using, and on a MCS of UE 115-*b*. When calculating the power headroom for the second TTI, UE 115-*b* may assume a transmission of a second uplink message that may include a PUCCH or a PUSCH, or both.

At 440, UE 115-*b* may transmit an additional PHR. The additional PHR may be transmitted on the resources of the serving cell, for example, provided by the grant of resources received at 405. In some cases, UE 115-*b* may further transmit, to base station 105-*b*, a second uplink message that may, for example, include the PUSCH without the PUCCH or may include the PUCCH and the PUSCH.

At 445, base station 105-*b* may determine a second resource allocation. The second resource allocation may reallocate available resources among UE 115-*b*, other UEs 115, or other devices in communication with base station 105-*b*, where the reallocation may differ from the first resource allocation. Based on values received in the PHR, base station 105-*b* may determine, for example, that the bandwidth allocated to a UE 115-*b* may be increased or decreased with respect to the bandwidth allocated in the first resource allocation.

Figure 5:
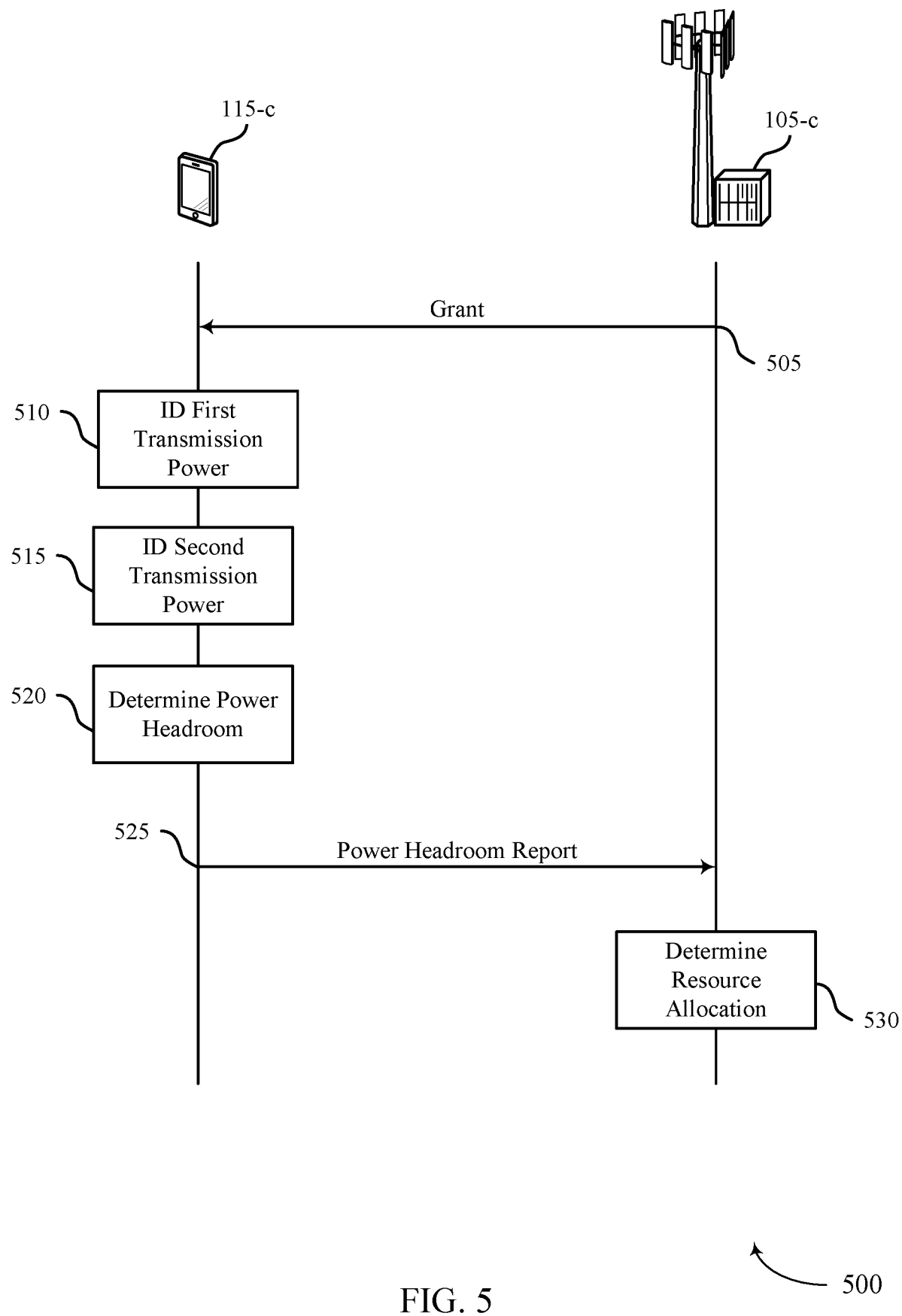

FIG. 5 illustrates an example of a process flow 500 that supports power headroom reporting for systems with multiple TTIs. Process flow 500 may include a base station 105-*c* and UE 115-*c*, which may be examples of the corresponding devices as described with reference to FIGS. 1 and 2. UE 115-*c* and base station 105-*c* may each communicate using multiple TTIs, where the TTIs have different durations (e.g., a two-symbol TTI and a 1 ms TTI). Process flow 500 may be an example of a system where a power headroom is jointly reported for multiple TTIs with different durations.

At 505, base station 105-*c* may transmit, and UE 115-*c* may receive, a grant of resources for a set of TTIs. For example, the grant of resources may include time-frequency resources that UE 115-*c* may use for the transmission of uplink data or signaling via a PUSCH or an sPUSCH. In some cases, the grant of resources may include a TPC command for a set of TTIs of a first TTI duration that overlaps in time with a second TTI of a second TTI duration. In some cases, UE 115-*c* may determine that a report of the power headroom is due for a first TTI of the first TTI duration or for a second TTI of the second TTI duration. The first TTI may be an initial TTI scheduled from the set of TTIs. At 510, UE 115-*c* may identify a first transmission power for a first TTI of a first TTI duration, and UE 115-*c* may identify a second transmission power for a second TTI having a second TTI duration at 515.

At 520, UE 115-*c* may determine a power headroom based on a maximum transmission power for a serving cell, the first transmission power for the first TTI, and the second transmission power for the second TTI. In some cases, when determining the power headroom for the first and second TTI duration, UE 115-*c* may assume a transmission of uplink messages including at least one of a PUSCH, a PUCCH, an sPUSCH, or an sPUCCH, or any combination thereof. In some cases, the power headroom may be determined based on the TPC command and the power headroom is associated with each TTI in the set of TTIs. The power headroom may be determined based on a maximum power headroom or an average power headroom for TTIs of the set of TTIs. In some examples, the report of the power headroom includes a value that indicates an index of the first TTI.

At 525, UE 115-*c* may transmit, and base station 105-*c* may receive, the report of the power headroom on resources of the serving cell. For example, UE 115-*c* may transmit a PHR on time-frequency resources using PUSCH or sPUSCH of the serving cell. In some cases, the use of either PUSCH or sPUSCH for the transmission of the PHR may be based on an availability of the resources on the serving cell, for example, in accordance with the grant of resources received at 505. In some cases, the PHR is transmitted based at least in part on the determination that the report is due for the first TTI or the second TTI. At 530, base station 105-c may determine a resource allocation based on the report of the power headroom provided by UE 115-c. For instance, base station 105-c may determine a number of resource blocks that UE 115-c may use for subsequent transmission based on the power headroom that UE 115-c reported.

Figure 6:
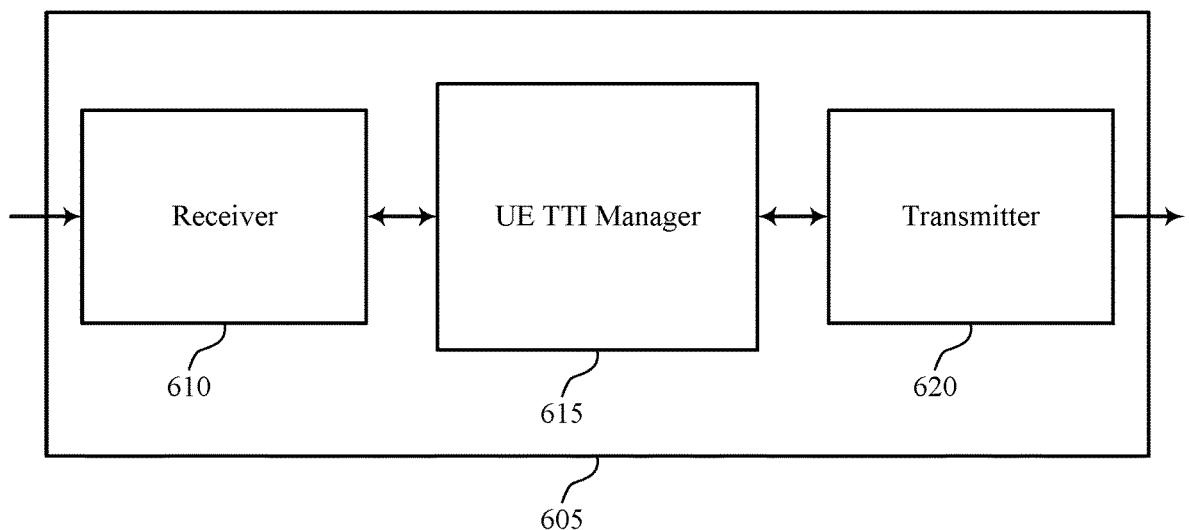
FIGS. 6 through 8 show block diagrams of a device or devices that support power headroom reporting for systems with multiple TTIs in accordance with aspects of the present disclosure.

FIG. 6 shows a block diagram 600 of a wireless device 605 that supports power headroom reporting for systems with multiple TTIs in accordance with various aspects of the present disclosure. Wireless device 605 may be an example of aspects of a UE 115 as described with reference to FIG. 1. Wireless device 605 may include receiver 610, UE TTI manager 615, and transmitter 620. Wireless device 605 may also include a processor. Each of these components may be in communication with one another (e.g., via one or more buses). In some cases, wireless device 605 may be configured to operate in a system that supports TTIs of a first duration (e.g., short TTIs, such as a two-symbol TTI) and TTIs of a second TTI duration that is longer than the first TTI duration (e.g., 1 ms TTIs).

Receiver 610 may receive information such as packets, user data, or control information associated with various information channels (e.g., control channels, data channels, and information related to power headroom reporting for systems with multiple TTIs, etc.). Information may be passed on to other components of the device. The receiver 610 may be an example of aspects of the transceiver 935 described with reference to FIG. 9.

UE TTI manager 615 may be an example of aspects of the UE TTI manager 915 described with reference to FIG. 9. UE TTI manager 615 and/or at least some of its various sub-components may be implemented in hardware, software executed by a processor, firmware, or any combination thereof. If implemented in software executed by a processor, the functions of the UE TTI manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE TTI manager 615 and/or at least some of its various sub-components may be physically located at various positions, including being distributed such that portions of functions are implemented at different physical locations by one or more physical devices. In some examples, UE TTI manager 615 and/or at least some of its various sub-components may be a separate and distinct component in accordance with various aspects of the present disclosure. In other examples, UE TTI manager 615 and/or at least some of its various sub-components may be combined with one or more other hardware components, including but not limited to a receiver, a transmitter, a transceiver, one or more other components described in the present disclosure, or any combination thereof in accordance with various aspects of the present disclosure.

In some examples, UE TTI manager 615 may identify a first transmission power for a first TTI of the first TTI duration, determine a power headroom based on a maximum transmission power for a serving cell and the first transmission power for the first TTI, and transmit a report of the power headroom using at least one of a PUSCH on resources of the serving cell or an sPUSCH on the resources of the serving cell.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
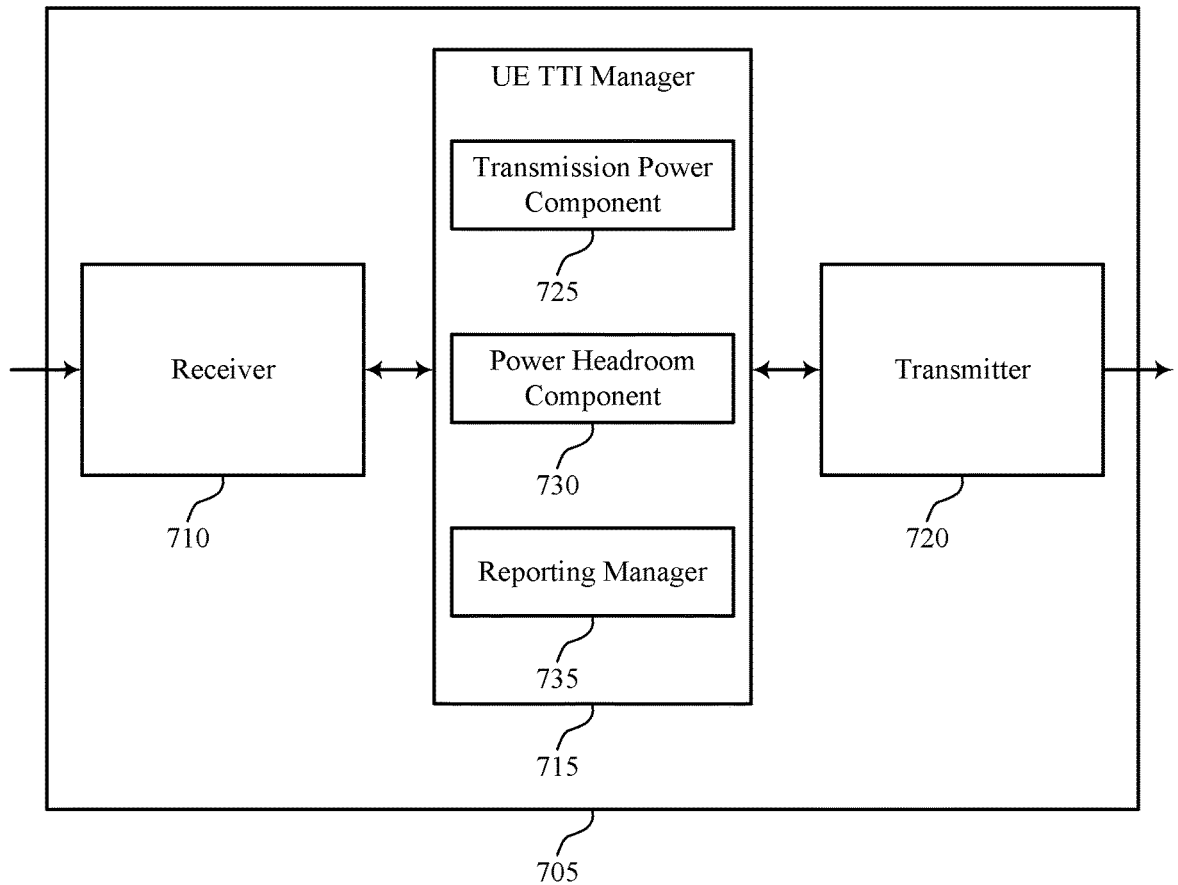

FIG. 7 shows a block diagram 700 of a wireless device 705 that supports power headroom reporting for systems with multiple TTIs in accordance with various aspects of the present disclosure. Wireless device 705 may be an example of aspects of a wireless device 605 or a UE 115 as described with reference to FIGS. 1 and 6. Additionally, wireless device 705 may operate in a system that supports a first TTI duration (e.g., a short TTI, such as a two-symbol TTI) and a second TTI duration that is longer than the first TTI duration (e.g., a 1 ms TTI). Wireless device 705 may include receiver 710, UE TTI manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to power headroom reporting for systems with multiple TTIs, etc.). Information may be passed on to other components of the device. The receiver 710 may be an example of aspects of the transceiver 935 described with reference to FIG. 9. UE TTI manager 715 may be an example of aspects of the UE TTI manager 915 described with reference to FIG. 9. UE TTI manager 715 may also include transmission power component 725, power headroom component 730, and reporting manager 735.

Transmission power component 725 may identify a first transmission power for a first TTI of the first TTI duration and identify a second transmission power for a second TTI of the second TTI duration. In some cases, transmission power component 725 may identify the second transmission power for the second TTI having the second TTI duration, where a power headroom is determined based on the first transmission power for the first TTI and the second transmission power for the second TTI. In some examples, a set of TTIs of the first TTI duration overlaps in time with the second TTI, and the set of TTIs may include the first TTI. In some cases, the first TTI includes an initial TTI scheduled from the set of TTIs, where the set of TTIs includes the first TTI. That is, the first TTI may be one TTI of a set of TTIs.

Power headroom component 730 may determine a power headroom based on a maximum transmission power for a serving cell and the first transmission power for the first TTI and determine an additional power headroom based on the maximum transmission power for the serving cell and the second transmission power for the second TTI. In some cases, the power headroom is determined based on a maximum power headroom or an average power headroom for TTIs of the set of TTIs. In some cases, the power headroom is based on a configuration of the set of cell groups and the initial scheduled TTI. In some cases, the power headroom is based on a configuration of the set of cell groups and includes a value that indicates an index of the first TTI.

Reporting manager 735 may transmit a report of the power headroom using at least one of a PUSCH on resources of the serving cell or an sPUSCH on the resources of the serving cell and transmit an additional report of the additional power headroom on the resources of the serving cell. In some cases, reporting manager 735 may determine that the report of the power headroom is due for the first TTI of the first TTI duration or the second TTI of the second TTI duration, and the report of the power headroom may be transmitted based on the determination that the report is due for the first TTI or the second TTI. Additionally or alternatively, the reporting manager 735 may determine that the report for the power headroom is due for the first TTI of the first TTI duration, where the report for the power headroom is transmitted based on the determination that the report is due for the first TTI. In some examples, the report for the power headroom is transmitted based on the determination that the report is due for the second TTI. In some cases, the report of the power headroom includes a value that indicates an index of the first TTI.

In some examples, reporting manager 735 may determine that the report of the power headroom is due for the a TTI of a first component carrier and determine that an additional report of power headroom is due for a TTI of a second component carrier. In some cases, the reporting manager 735 may transmit, on the first component carrier, the report of the power headroom and the additional report of the power headroom. In some examples, the additional report of the power headroom is calculated using a virtual mode based on a grant of resources for the first component carrier.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
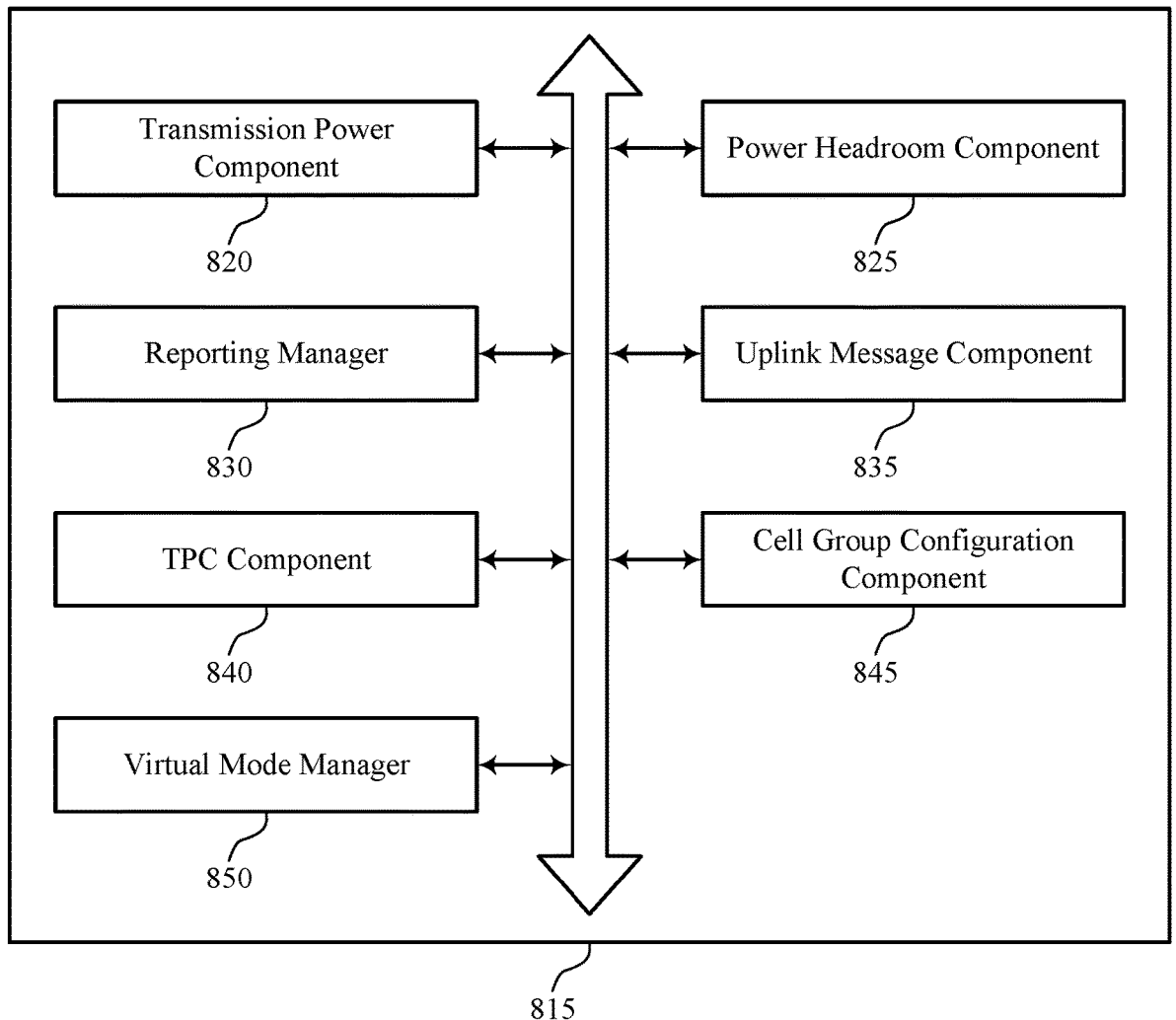

FIG. 8 shows a block diagram 800 of a UE TTI manager 815 that supports power headroom reporting for systems with multiple TTIs in accordance with various aspects of the present disclosure. The UE TTI manager 815 may be an example of aspects of a UE TTI manager 615, a UE TTI manager 715, or a UE TTI manager 915 described with reference to FIGS. 6, 7, and 9. For example, UE TTI manager 815 may operate in a system that supports a first TTI duration (e.g., a short TTI, such as a two-symbol TTI) and a second TTI duration that is longer than the first TTI duration (e.g., a 1 ms TTI). The UE TTI manager 815 may include transmission power component 820, power headroom component 825, reporting manager 830, uplink message component 835, TPC component 840, cell group configuration component 845, and virtual mode manager 850. Each of these modules may communicate, directly or indirectly, with one another (e.g., via one or more buses).

Transmission power component 820 may identify a first transmission power for a first TTI of the first TTI duration and identify a second transmission power for a second TTI of the second TTI duration. In some cases, transmission power component 820 may identify the second transmission power for the second TTI having the second TTI duration, where a power headroom is determined based on the first transmission power for the first TTI and the second transmission power for the second TTI. In some examples, a set of TTIs of the first TTI duration overlaps in time with the second TTI, and the set of TTIs may include the first TTI. In some cases, the first TTI includes an initial TTI scheduled from the set of TTIs, where the set of TTIs includes the first TTI. That is, the first TTI may be one TTI of a set of TTIs.

Power headroom component 825 may determine a power headroom based on a maximum transmission power for a serving cell and the first transmission power for the first TTI and determine an additional power headroom based on the maximum transmission power for the serving cell and the second transmission power for the second TTI. In some cases, the power headroom is determined based on a maximum power headroom or an average power headroom for TTIs of the set of TTIs. In some cases, the power headroom is based on a configuration of the set of cell groups and the initial scheduled TTI. In some cases, the power headroom is based on a configuration of the set of cell groups and includes a value that indicates an index of the first TTI.

Reporting manager 830 may transmit a report of the power headroom on resources of the serving cell and transmit an additional report of the additional power headroom on the resources of the serving cell. In some cases, reporting manager 830 may determine that the report of the power headroom is due for the first TTI of the first TTI duration or the second TTI of the second TTI duration, and the report of the power headroom may be transmitted based on the determination that the report is due for the first TTI or the second TTI. Additionally, the reporting manager 830 may determine that the report for the power headroom is due for the first TTI of the first TTI duration, where the report for the power headroom is transmitted based on the determination that the report is due for the first TTI. In some examples, the report for the power headroom is transmitted based on the determination that the report is due for the second TTI. In some cases, the report of the power headroom includes a value that indicates an index of the first TTI.

In some examples, reporting manager 830 may determine that the report of the power headroom is due for the a TTI of a first component carrier and determine that an additional report of power headroom is due for a TTI of a second component carrier. In some cases, the reporting manager 830 may transmit, on the first component carrier, the report of the power headroom and the additional report of the power headroom. In some examples, the additional report of the power headroom is calculated using a virtual mode based on a grant of resources for the first component carrier.

Uplink message component 835 may transmit a first uplink message that includes an sPUCCH or an sPUSCH, or both, during the first TTI. Additionally or alternatively, uplink message component 835 may transmit a second uplink message that includes a PUCCH or a PUSCH, or both, during the second TTI, and transmit one or more uplink messages including at least one of a PUSCH, a PUCCH, an sPUSCH, an sPUCCH, or any combination thereof.

TPC component 840 may receive a TPC command in a grant of resources for a set of TTIs of the first TTI duration that overlaps in time with the second TTI of the second TTI duration, where the power headroom is determined based on the TPC command and the power headroom is associated with each TTI in the set of TTIs and receive a TPC command associated with the first TTI of the first TTI duration, where the power headroom is determined based on the TPC command. Cell group configuration component 845 may receive an RRC message that configures a set of cell groups that includes the serving cell.

Virtual mode manager 850 may identify an indication of a virtual mode associated with power headroom reports for a secondary cell group of the set of cell groups, where the first TTI includes an initial scheduled TTI of a set of TTIs, and where the report of the power headroom is based on the virtual mode and the initial scheduled TTI. In some cases, the virtual mode includes a first virtual mode for the first TTI duration or a second virtual mode for the second TTI duration, or both.

Figure 9:
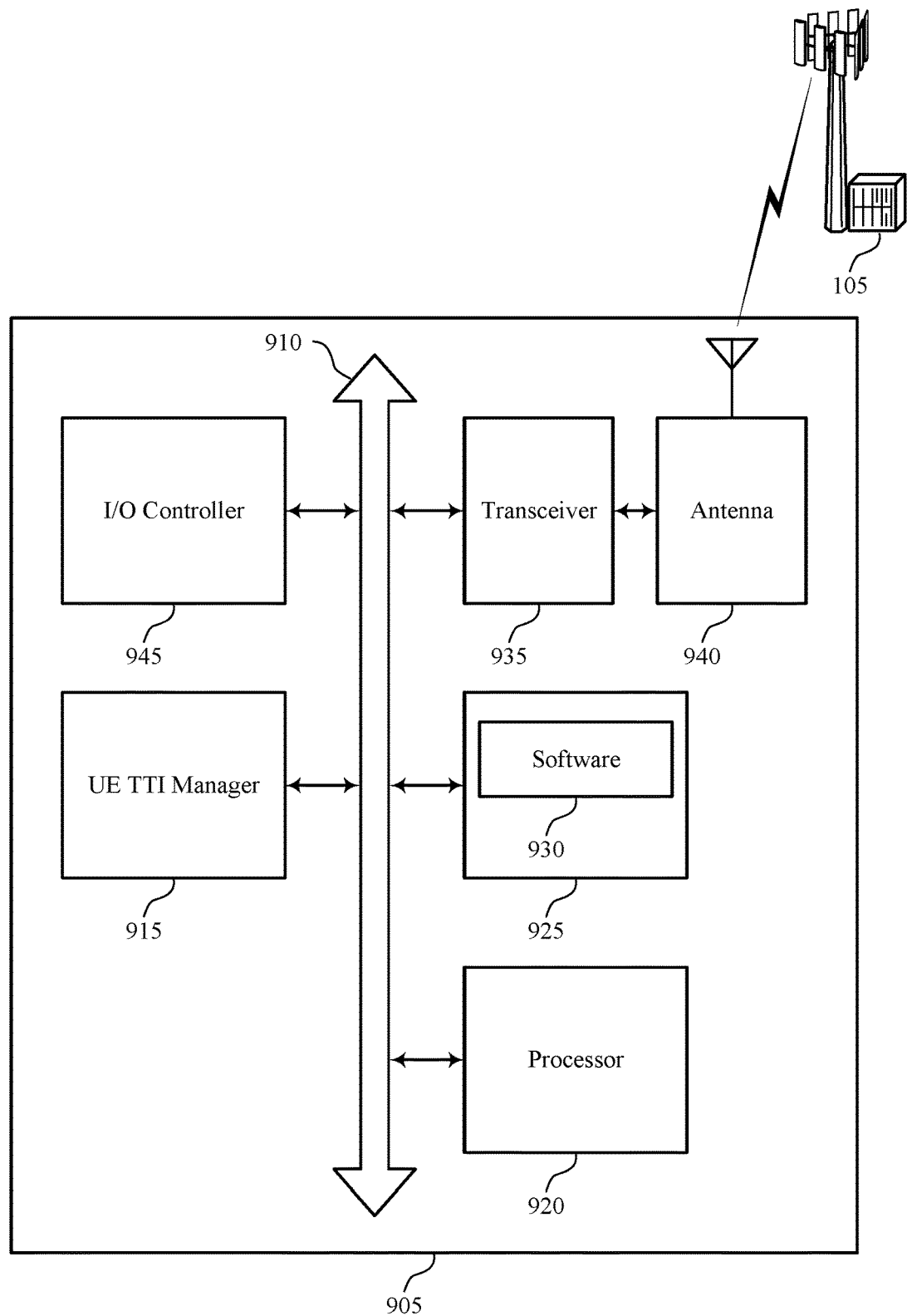
FIG. 9 illustrates a block diagram of a system including a user equipment (UE) that supports power headroom reporting for systems with multiple TTIs in accordance with aspects of the present disclosure.

FIG. 9 shows a diagram of a system 900 including a device 905 that supports power headroom reporting for systems with multiple TTIs in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE TTI manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting power headroom reporting for systems with multiple TTIs).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support power headroom reporting for systems with multiple TTIs. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
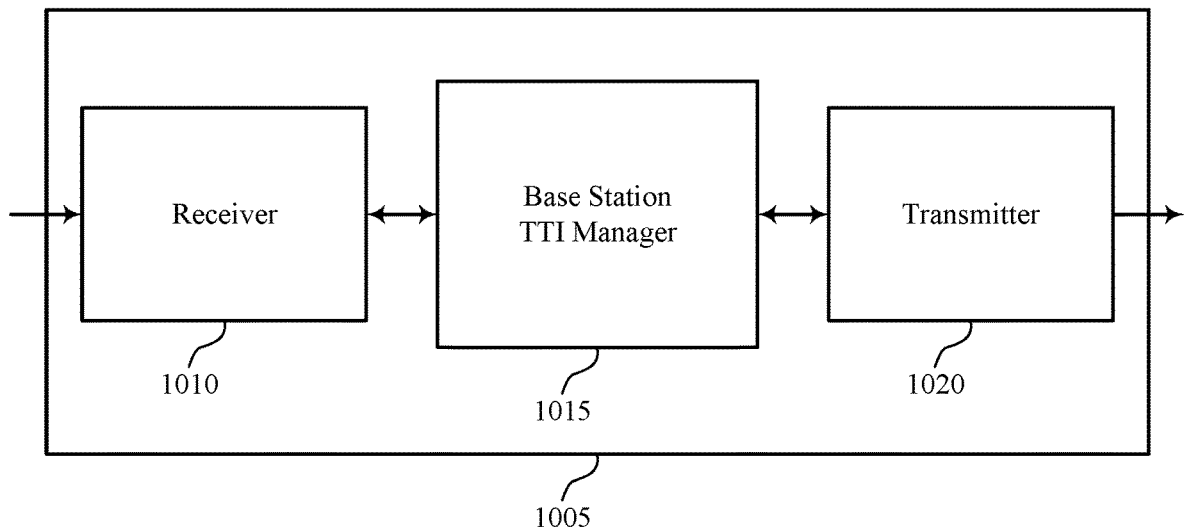
FIGS. 10 through 12 show block diagrams of a device or devices that support power headroom reporting for systems with multiple TTIs in accordance with aspects of the present disclosure.

FIG. 10 shows a block diagram 1000 of a wireless device 1005 that supports power headroom reporting for systems with multiple TTIs in accordance with various aspects of the present disclosure. Wireless device 1005 may be an example of aspects of a base station 105 as described with reference to FIG. 1. In some cases, wireless device 1005 may operate in a system that supports a first TTI duration (e.g., a short TTI, such as a two-symbol TTI) and a second TTI duration that is longer than the first TTI duration (e.g., a 1 ms TTI). Wireless device 1005 may include receiver 1010, base station TTI manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to power headroom reporting for systems with multiple TTIs, etc.). Information may be passed on to other components of the device. The receiver 1010 may be an example of aspects of the transceiver 1335 described with reference to FIG. 13. For example, receiver 1010 may receive a first uplink message that includes an sPUCCH or an sPUSCH, or both, during a first TTI and receive a second uplink message that includes a PUCCH or a PUSCH, or both, during a second TTI. Additionally or alternatively, receiver 1010 may receive one or more uplink messages including at least one of a PUSCH, a PUCCH, an sPUSCH, an sPUCCH, or any combination thereof.

Base station TTI manager 1015 may be an example of aspects of the base station TTI manager 1315 described with reference to FIG. 13. Base station TTI manager 1015 and/or at least some of its various sub-components may be implemented in hardware, software executed by a processor, firmware, or any combination thereof. If implemented in software executed by a processor, the functions of the base station TTI manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station TTI manager 1015 and/or at least some of its various sub-components may be physically located at various positions, including being distributed such that portions of functions are implemented at different physical locations by one or more physical devices. In some examples, base station TTI manager 1015 and/or at least some of its various sub-components may be a separate and distinct component in accordance with various aspects of the present disclosure. In other examples, base station TTI manager 1015 and/or at least some of its various sub-components may be combined with one or more other hardware components, including but not limited to a receiver, a transmitter, a transceiver, one or more other components described in the present disclosure, or any combination thereof in accordance with various aspects of the present disclosure.

Base station TTI manager 1015 may receive a report of a power headroom via at least one of a PUSCH on resources of the serving cell or an sPUSCH on the resources of a serving cell, where the power headroom is based on a maximum transmission power for the serving cell and a first transmission power for a first TTI and determine a resource allocation based on the report of the power headroom.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
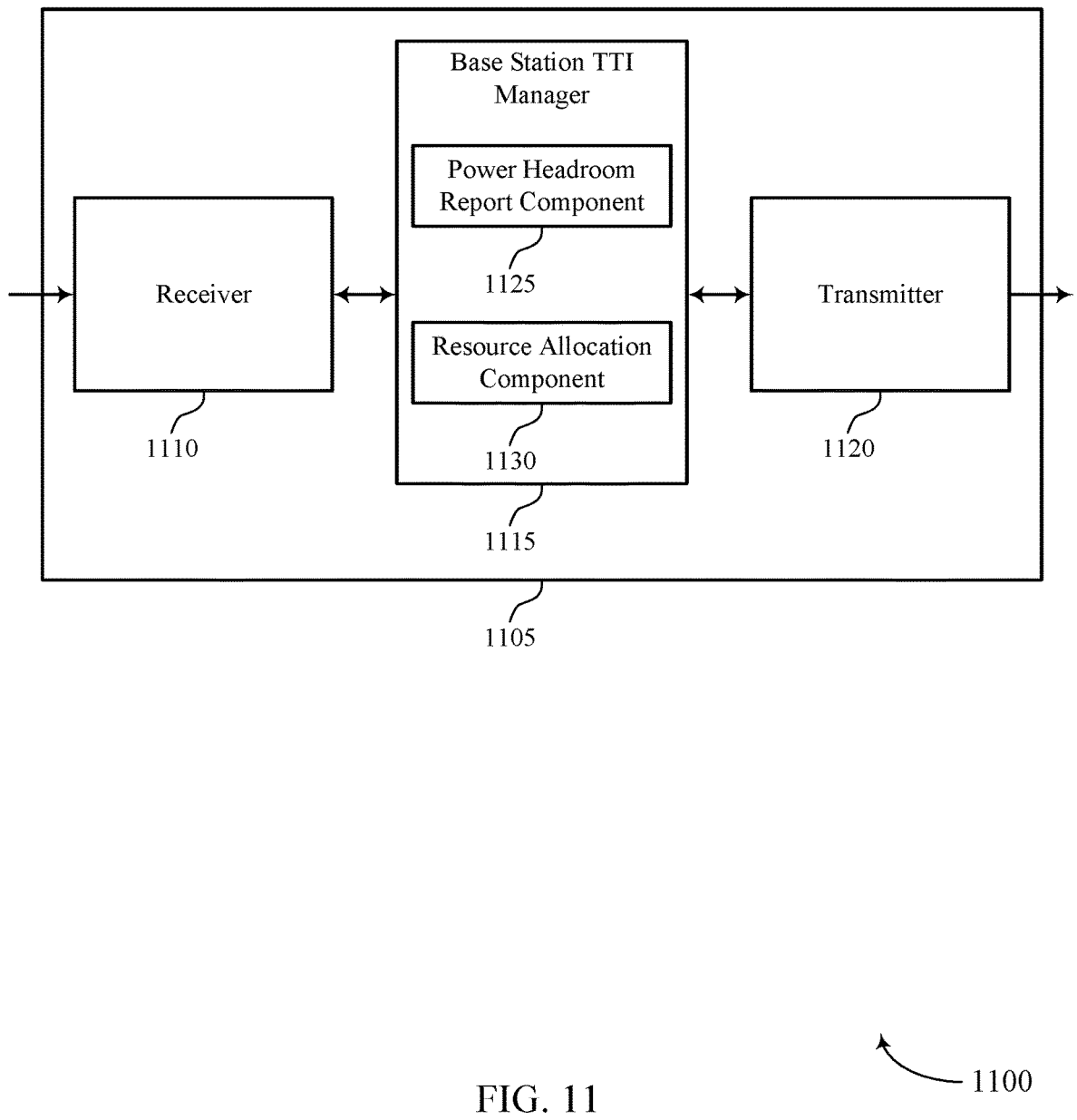

FIG. 11 shows a block diagram 1100 of a wireless device 1105 that supports power headroom reporting for systems with multiple TTIs in accordance with various aspects of the present disclosure. Wireless device 1105 may be an example of aspects of a wireless device 1005 or a base station 105 as described with reference to FIGS. 1 and 10. Wireless device 1105 may include receiver 1110, base station TTI manager 1115, and transmitter 1120. Wireless device 1105 may also include a processor. Each of these components may be in communication with one another (e.g., via one or more buses). In some examples, wireless device 1105 may wirelessly communicate in a system that supports TTIs of a first duration (e.g., short TTIs, such as a two-symbol TTI) and TTIs of a second TTI duration that is longer than the first TTI duration (e.g., 1 ms TTIs).

Receiver 1110 may receive information such as packets, user data, or control information associated with various information channels (e.g., control channels, data channels, and information related to power headroom reporting for systems with multiple TTIs, etc.). Information may be passed on to other components of the device. The receiver 1110 may be an example of aspects of the transceiver 1335 described with reference to FIG. 13.

Base station TTI manager 1115 may be an example of aspects of the base station TTI manager 1315 described with reference to FIG. 13. Base station TTI manager 1115 may also include power headroom report component 1125 and resource allocation component 1130. Power headroom report component 1125 may receive a report of a power headroom via at least one of a PUSCH on resources of the serving cell or an sPUSCH on the resources of a serving cell, where the power headroom is based on a maximum transmission power for the serving cell and a first transmission power for a first TTI and receive an additional report of an additional power headroom on the resources of the serving cell where the additional power headroom is based on the maximum transmission power for the serving cell and a second transmission power for a second TTI.

In some cases, the power headroom is based on a configuration of a set of cell groups and includes a value that indicates an index of the first TTI. In some cases, the power headroom is based on the first transmission power for the first TTI and a transmission power for a second TTI having the second TTI duration. In some cases, the report of the power headroom is due for the first TTI of the first TTI duration or the second TTI of the second TTI duration. In some cases, a set of TTIs of the first TTI duration overlaps in time with the second TTI, the set of TTIs includes the first TTI.

In some cases, the first TTI includes an initial TTI scheduled from the set of TTIs. In some cases, the report of the power headroom includes a value that indicates an index of the first TTI. Additionally or alternatively, the first TTI includes an initial scheduled TTI of a set of TTIs. In some cases, the power headroom is based on a configuration of the set of cell groups and the initial scheduled TTI. In some cases, the first TTI includes one TTI of a set of TTIs. In some cases, the power headroom is based on a maximum power headroom or an average power headroom for TTIs of the set of TTIs.

Resource allocation component 1130 may determine a resource allocation based on the report of the power headroom and determine the resource allocation based on the report of the additional power headroom. Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
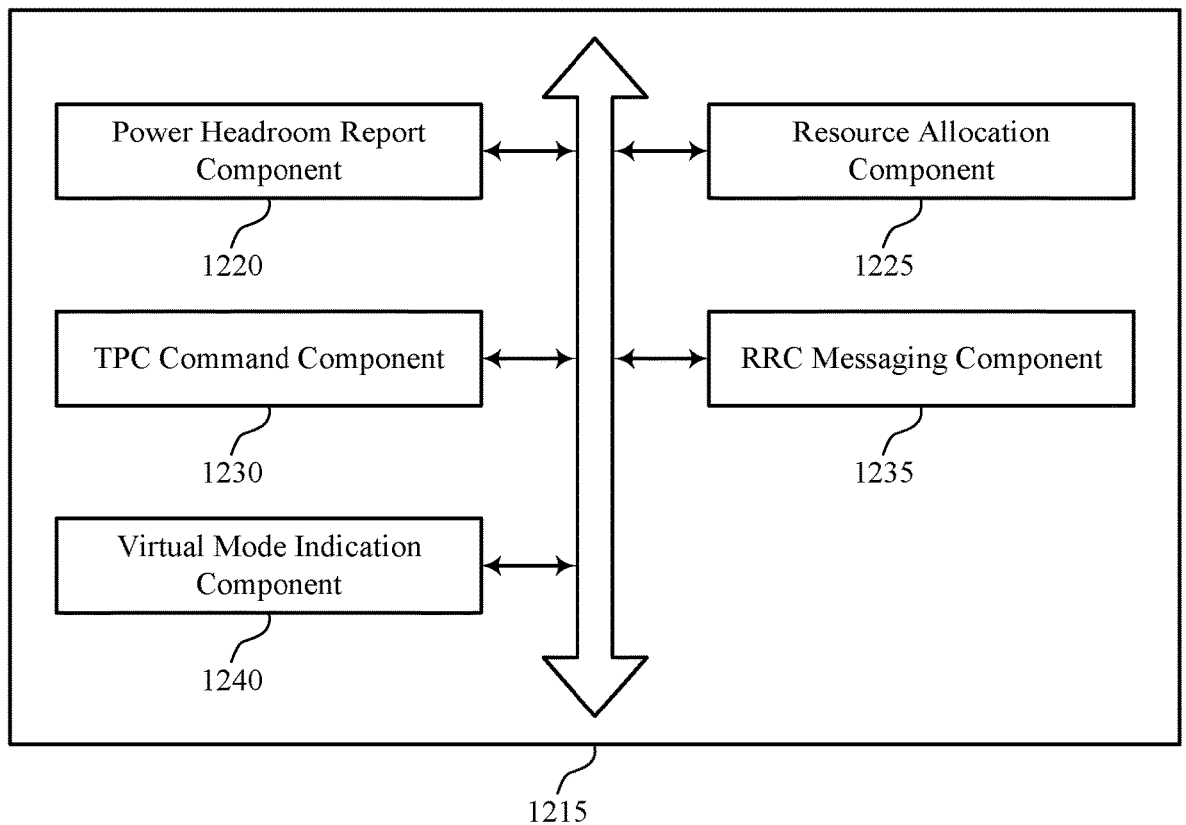

FIG. 12 shows a block diagram 1200 of a base station TTI manager 1215 that supports power headroom reporting for systems with multiple TTIs in accordance with various aspects of the present disclosure. The base station TTI manager 1215 may be an example of aspects of a base station TTI manager 1315 described with reference to FIGS. 10, 11, and 13. The base station TTI manager 1215 may include power headroom report component 1220, resource allocation component 1225, TPC command component 1230, RRC messaging component 1235, and virtual mode indication component 1240. Each of these modules may communicate, directly or indirectly, with one another (e.g., via one or more buses). Base station TTI manager 1215 may operate in a system that supports a first TTI duration (e.g., a short TTI, such as a two-symbol TTI) and a second TTI duration that is longer than the first TTI duration (e.g., a 1 ms TTI).

Power headroom report component 1220 may receive a report of a power headroom via at least one of a PUSCH on resources of the serving cell or an sPUSCH on the resources of a serving cell, where the power headroom is based on a maximum transmission power for the serving cell and a first transmission power for a first TTI and receive an additional report of an additional power headroom on the resources of the serving cell where the additional power headroom is based on the maximum transmission power for the serving cell and a second transmission power for a second TTI.

In some cases, the power headroom is based on a configuration of a set of cell groups and includes a value that indicates an index of the first TTI. In some cases, the power headroom is based on the first transmission power for the first TTI and a transmission power for a second TTI having the second TTI duration. In some cases, the report of the power headroom is due for the first TTI of the first TTI duration or the second TTI of the second TTI duration. In some cases, a set of TTIs of the first TTI duration overlaps in time with the second TTI, the set of TTIs includes the first TTI.

In some cases, the first TTI includes an initial TTI scheduled from the set of TTIs. In some cases, the report of the power headroom includes a value that indicates an index of the first TTI. Additionally or alternatively, the first TTI includes an initial scheduled TTI of a set of TTIs. In some cases, the power headroom is based on a configuration of the set of cell groups and the initial scheduled TTI. In some cases, the first TTI includes one TTI of a set of TTIs. In some cases, the power headroom is based on a maximum power headroom or an average power headroom for TTIs of the set of TTIs.

Resource allocation component 1225 may determine a resource allocation based on the report of the power headroom and determine the resource allocation based on the report of the additional power headroom. TPC command component 1230 may transmit a TPC command in a grant of resources for a set of TTIs of the first TTI duration that overlaps in time with the second TTI of the second TTI duration, where the power headroom is based on the TPC command and the power headroom is associated with each TTI in the set of TTIs. In some cases, TPC command component 1230 may transmit a TPC command associated with the first TTI of the first TTI duration, where the power headroom is determined based on the TPC command.

RRC messaging component 1235 may transmit an RRC message that configures a set of cell groups that includes the serving cell. Virtual mode indication component 1240 may transmit an indication of a virtual mode associated with power headroom reports for a secondary cell group of the set of cell groups, where the first TTI includes an initial scheduled TTI of a set of TTIs, and the report of the power headroom may be based on the virtual mode and the initial scheduled TTI. In some cases, the virtual mode includes a first virtual mode for the first TTI duration or a second virtual mode the second TTI duration, or both.

Figure 13:
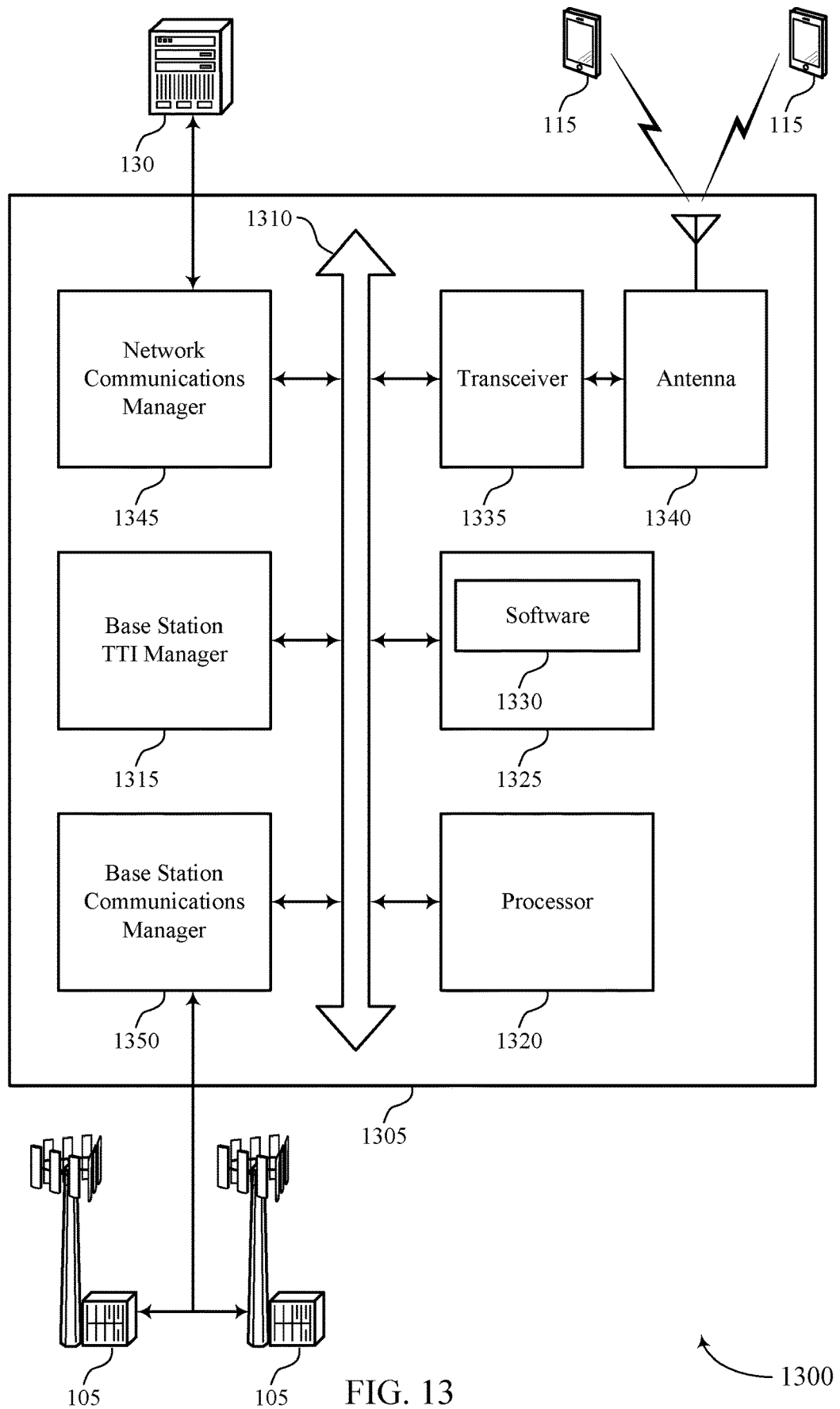
FIG. 13 illustrates a block diagram of a system including a base station that supports power headroom reporting for systems with multiple TTIs in accordance with aspects of the present disclosure.

FIG. 13 shows a diagram of a system 1300 including a device 1305 that supports power headroom reporting for systems with multiple TTIs in accordance with various aspects of the present disclosure. Device 1305 may be an example of or include the components of a base station 105 as described above, e.g., with reference to FIG. 1. Device 1305 may include components for bi-directional voice and data communications including components for transmitting and receiving communications, including base station TTI manager 1315, processor 1320, memory 1325, software 1330, transceiver 1335, antenna 1340, network communications manager 1345, and base station communications manager 1350. These components may be in electronic communication via one or more busses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting power headroom reporting for systems with multiple TTIs).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support power headroom reporting for systems with multiple TTIs. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions. Network communications manager 1345 may manage communications with the core network (e.g., via one or more wired backhaul links). For example, the network communications manager 1345 may manage the transfer of data communications for client devices, such as one or more UEs 115.

Base station communications manager 1350 may manage communications with other base stations 105, and may include a controller or scheduler for controlling communications with UEs 115 in cooperation with other base stations 105. For example, the base station communications manager 1350 may coordinate scheduling for transmissions to UEs 115 for various interference mitigation techniques such as beamforming or joint transmission. In some examples, base station communications manager 1350 may provide an X2 interface within an LTE/LTE-A wireless communication network technology to provide communication between base stations 105.

Figure 14:
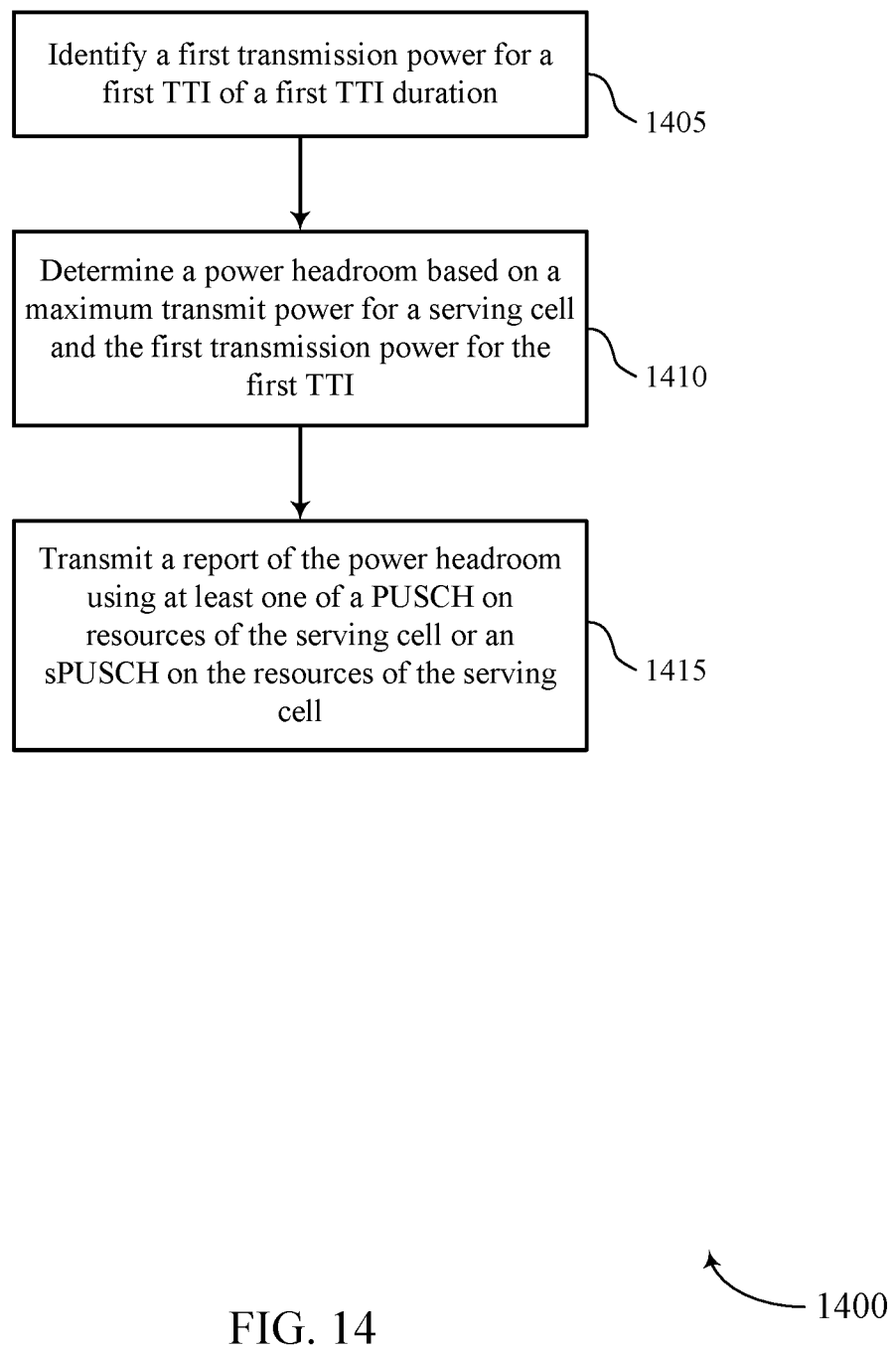
FIGS. 14 through 19 illustrate methods for power headroom reporting for systems with multiple TTIs in accordance with aspects of the present disclosure.

FIG. 14 shows a flowchart illustrating a method 1400 for power headroom reporting for systems with multiple TTIs in accordance with various aspects of the present disclosure. The operations of method 1400 may be implemented by a UE 115 or its components as described herein. For example, the operations of method 1400 may be performed by a UE TTI manager as described with reference to FIGS. 6 through 9. That is, method 1400 may illustrate steps performed by a UE 115 in a system that supports a first TTI duration (e.g., a short TTI) and a second TTI duration that is longer than the first TTI duration. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a first transmission power for a first TTI of the first TTI duration. The operations of 1405 may be performed according to the methods described with reference to FIGS. 1 through 4. In certain examples, aspects of the operations of 1405 may be performed by a transmission power component as described with reference to FIGS. 6 through 9.

At 1410 the UE 115 may determine a power headroom based at least in part on a maximum transmission power for a serving cell and the first transmission power for the first TTI. The operations of 1410 may be performed according to the methods described with reference to FIGS. 1 through 4. In certain examples, aspects of the operations of 1410 may be performed by a power headroom component as described with reference to FIGS. 6 through 9.

At 1415 the UE 115 may transmit a report of the power headroom using at least one of a PUSCH on resources of the serving cell or an sPUSCH on the resources of the serving cell. The operations of 1415 may be performed according to the methods described with reference to FIGS. 1 through 4. In certain examples, aspects of the operations of 1415 may be performed by a reporting manager as described with reference to FIGS. 6 through 9.

Figure 15:
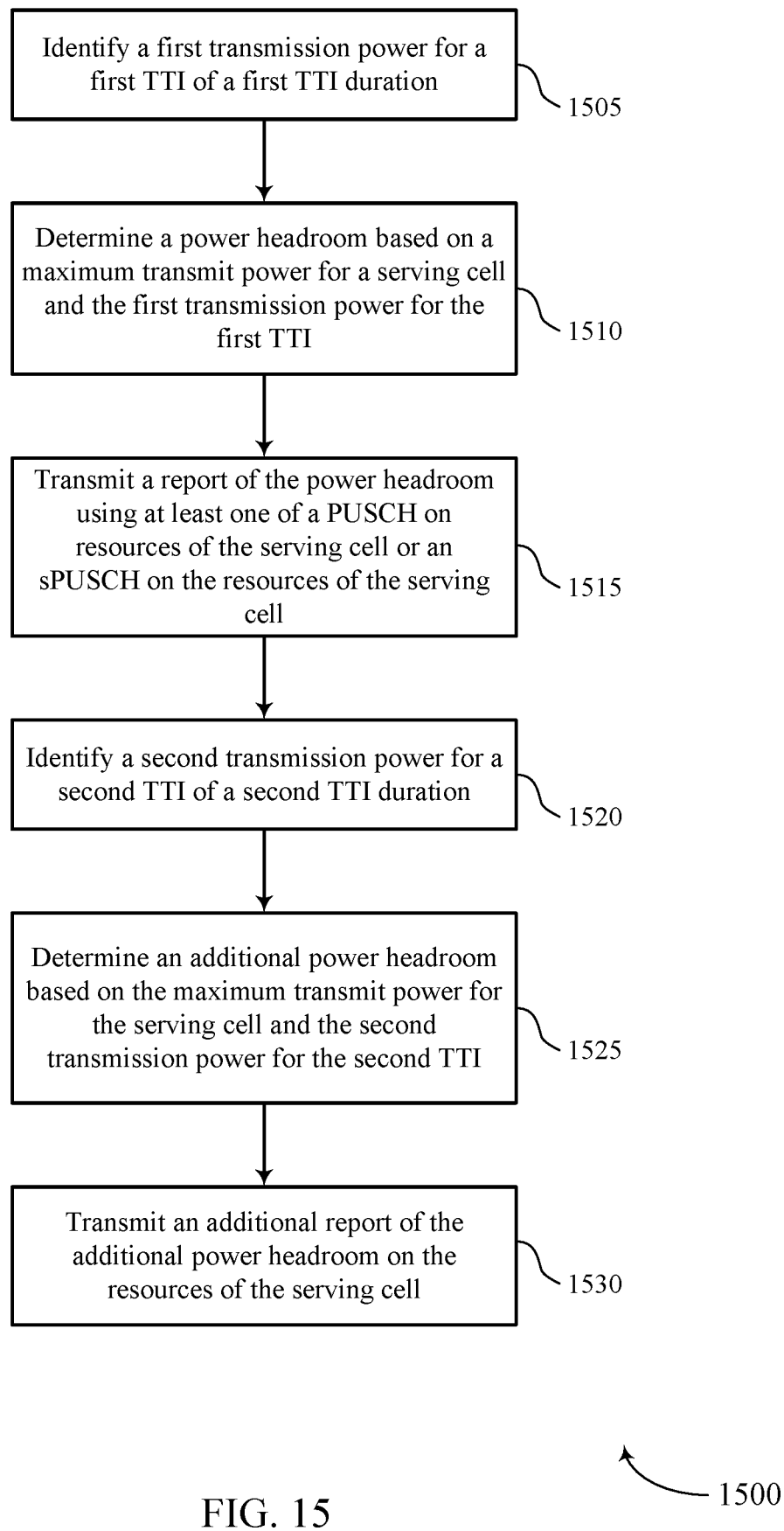

FIG. 15 shows a flowchart illustrating a method 1500 for power headroom reporting for systems with multiple TTIs in accordance with various aspects of the present disclosure. The operations of method 1500 may be implemented by a UE 115 or its components as described herein. For example, the operations of method 1500 may be performed by a UE TTI manager as described with reference to FIGS. 6 through 9. That is, method 1500 may illustrate a number of steps performed by a UE 115 or its components in a system that supports a first TTI duration (e.g., a short TTI) and a second TTI duration that is longer than the first TTI duration. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a first transmission power for a first TTI of the first TTI duration. The operations of 1505 may be performed according to the methods described with reference to FIGS. 1 through 4. In certain examples, aspects of the operations of 1505 may be performed by a transmission power component as described with reference to FIGS. 6 through 9.

At 1510 the UE 115 may determine a power headroom based at least in part on a maximum transmission power for a serving cell and the first transmission power for the first TTI. The operations of 1510 may be performed according to the methods described with reference to FIGS. 1 through 4. In certain examples, aspects of the operations of 1510 may be performed by a power headroom component as described with reference to FIGS. 6 through 9.

At 1515 the UE 115 may transmit a report of the power headroom using at least one of a PUSCH on resources of the serving cell or an sPUSCH on the resources of the serving cell. The operations of 1515 may be performed according to the methods described with reference to FIGS. 1 through 4. In certain examples, aspects of the operations of 1515 may be performed by a reporting manager as described with reference to FIGS. 6 through 9.

At 1520 the UE 115 may identify a second transmission power for a second TTI of the second TTI duration. The operations of 1520 may be performed according to the methods described with reference to FIGS. 1 through 4. In certain examples, aspects of the operations of 1520 may be performed by a transmission power component as described with reference to FIGS. 6 through 9.

At 1525 the UE 115 may determine an additional power headroom based at least in part on the maximum transmission power for the serving cell and the second transmission power for the second TTI. The operations of 1525 may be performed according to the methods described with reference to FIGS. 1 through 4. In certain examples, aspects of the operations of 1525 may be performed by a power headroom component as described with reference to FIGS. 6 through 9.

At 1530 the UE 115 may transmit an additional report of the additional power headroom on the resources of the serving cell. The operations of 1530 may be performed according to the methods described with reference to FIGS. 1 through 4. In certain examples, aspects of the operations of 1530 may be performed by a reporting manager as described with reference to FIGS. 6 through 9.

Figure 16:
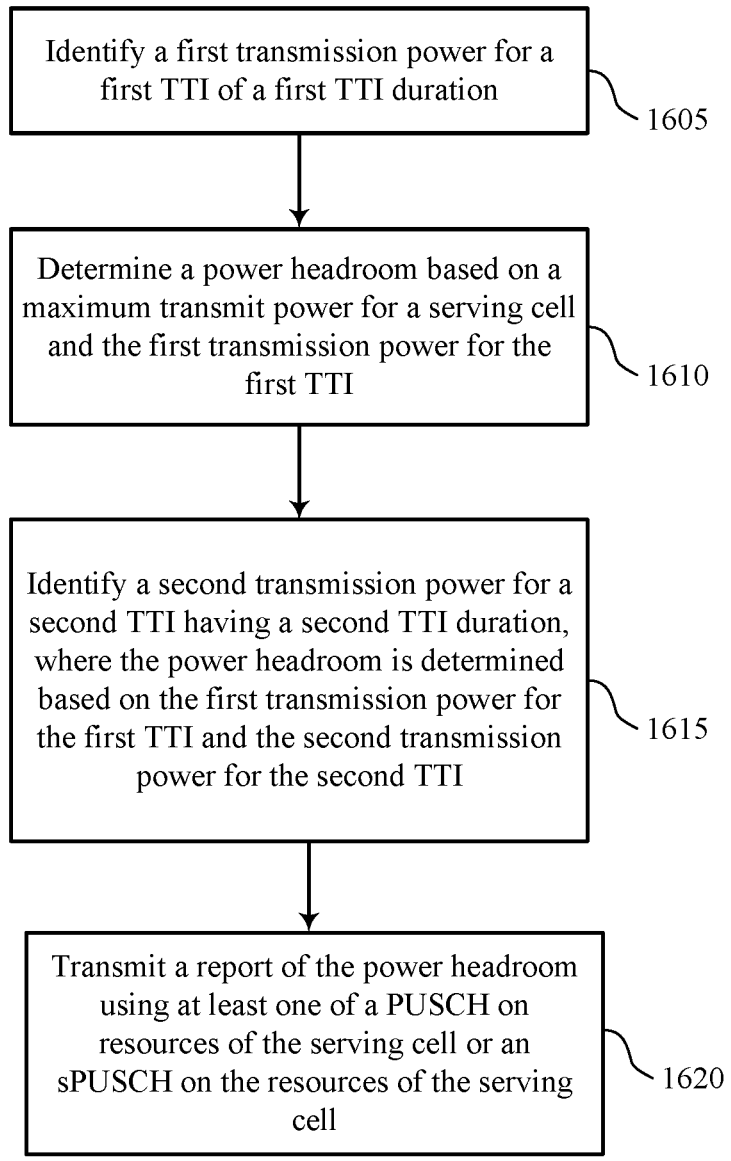

FIG. 16 shows a flowchart illustrating a method 1600 for power headroom reporting for systems with multiple TTIs in accordance with various aspects of the present disclosure. The operations of method 1600 may be implemented by a UE 115 or its components as described herein. For example, the operations of method 1600 may be performed by a UE TTI manager as described with reference to FIGS. 6 through 9. That is, method 1600 may illustrate steps performed by a UE 115 or its components in a system that supports a first TTI duration (e.g., a short TTI) and a second TTI duration that is longer than the first TTI duration. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may identify a first transmission power for a first TTI of the first TTI duration. The operations of 1605 may be performed according to the methods described with reference to FIGS. 1 through 4. In certain examples, aspects of the operations of 1605 may be performed by a transmission power component as described with reference to FIGS. 6 through 9.

At 1610 the UE 115 may determine a power headroom based at least in part on a maximum transmission power for a serving cell and the first transmission power for the first TTI. The operations of 1610 may be performed according to the methods described with reference to FIGS. 1 through 4. In certain examples, aspects of the operations of 1610 may be performed by a power headroom component as described with reference to FIGS. 6 through 9.

At 1615 the UE 115 may identify a second transmission power for a second TTI having the second TTI duration, wherein the power headroom is determined based at least in part on the first transmission power for the first TTI and the second transmission power for the second TTI. The operations of 1615 may be performed according to the methods described with reference to FIGS. 1 through 4. In certain examples, aspects of the operations of 1615 may be performed by a transmission power component as described with reference to FIGS. 6 through 9.

At 1620 the UE 115 may transmit a report of the power headroom using at least one of a PUSCH on resources of the serving cell or an sPUSCH on the resources of the serving cell. The operations of 1620 may be performed according to the methods described with reference to FIGS. 1 through 4. In certain examples, aspects of the operations of 1620 may be performed by a reporting manager as described with reference to FIGS. 6 through 9.

Figure 17:
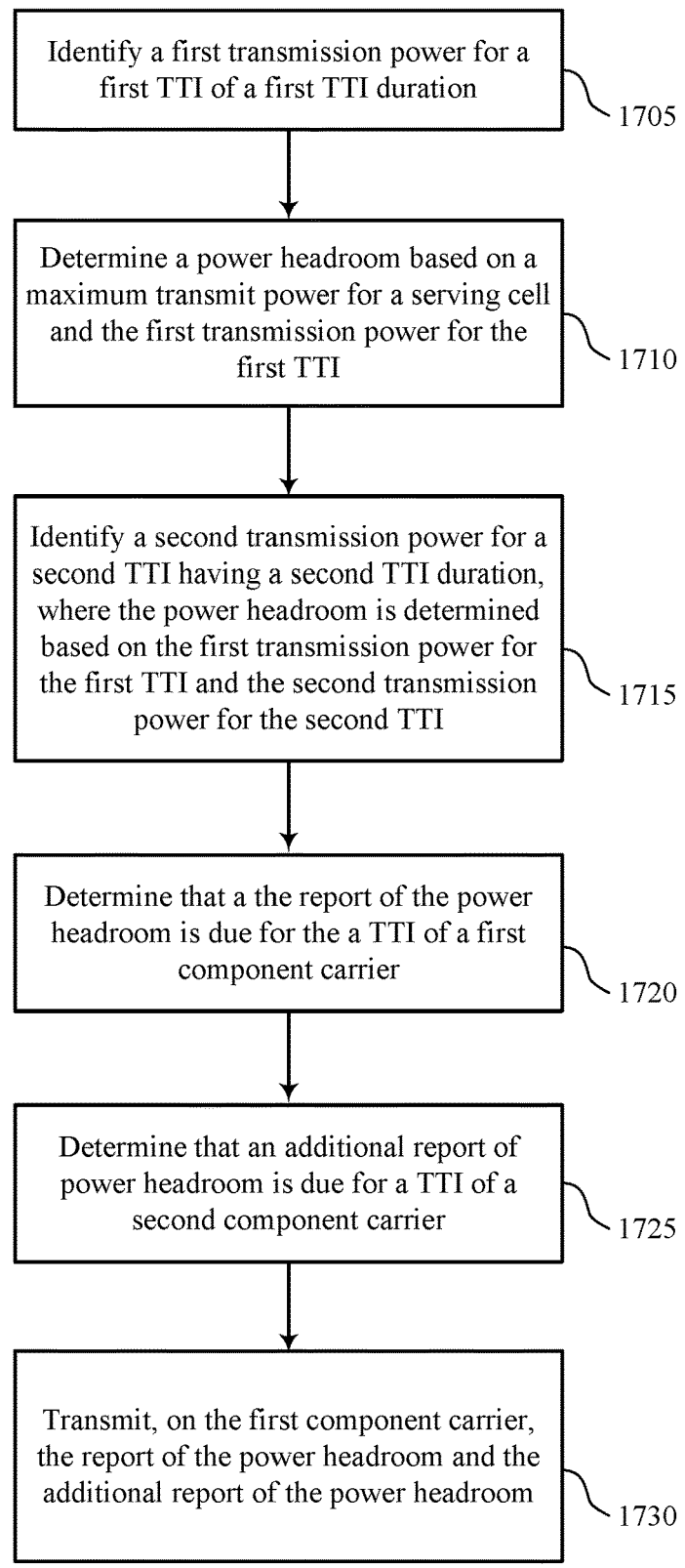

FIG. 17 shows a flowchart illustrating a method 1700 for power headroom reporting for systems with multiple TTIs in accordance with various aspects of the present disclosure. The operations of method 1700 may be implemented by a UE 115 or its components as described herein. For example, the operations of method 1700 may be performed by a UE TTI manager as described with reference to FIGS. 6 through 9. That is, method 1700 may illustrate steps performed by a UE 115 or its components in a system that supports a first TTI duration (e.g., a short TTI) and a second TTI duration that is longer than the first TTI duration. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may identify a first transmission power for a first TTI of the first TTI duration. The operations of 1705 may be performed according to the methods described with reference to FIGS. 1 through 4. In certain examples, aspects of the operations of 1705 may be performed by a transmission power component as described with reference to FIGS. 6 through 9.

At 1710 the UE 115 may determine a power headroom based at least in part on a maximum transmission power for a serving cell and the first transmission power for the first TTI. The operations of 1710 may be performed according to the methods described with reference to FIGS. 1 through 4.

In certain examples, aspects of the operations of 1710 may be performed by a power headroom component as described with reference to FIGS. 6 through 9.

At 1715 the UE 115 may identify a second transmission power for a second TTI having the second TTI duration, wherein the power headroom is determined based at least in part on the first transmission power for the first TTI and the second transmission power for the second TTI. The operations of 1715 may be performed according to the methods described with reference to FIGS. 1 through 4. In certain examples, aspects of the operations of 1715 may be performed by a transmission power component as described with reference to FIGS. 6 through 9.

At 1720 the UE 115 may determine that a the report of the power headroom is due for the a TTI of a first component carrier. The operations of 1720 may be performed according to the methods described with reference to FIGS. 1 through 4. In certain examples, aspects of the operations of 1720 may be performed by a reporting manager as described with reference to FIGS. 6 through 9.

At 1725 the UE 115 may determine that an additional report of power headroom is due for a TTI of a second component carrier. The operations of 1725 may be performed according to the methods described with reference to FIGS. 1 through 4. In certain examples, aspects of the operations of 1725 may be performed by a reporting manager as described with reference to FIGS. 6 through 9.

At 1730 the UE 115 may transmit, on the first component carrier, the report of the power headroom and the additional report of the power headroom. The operations of 1730 may be performed according to the methods described with reference to FIGS. 1 through 4. In certain examples, aspects of the operations of 1730 may be performed by a reporting manager as described with reference to FIGS. 6 through 9.

Figure 18:
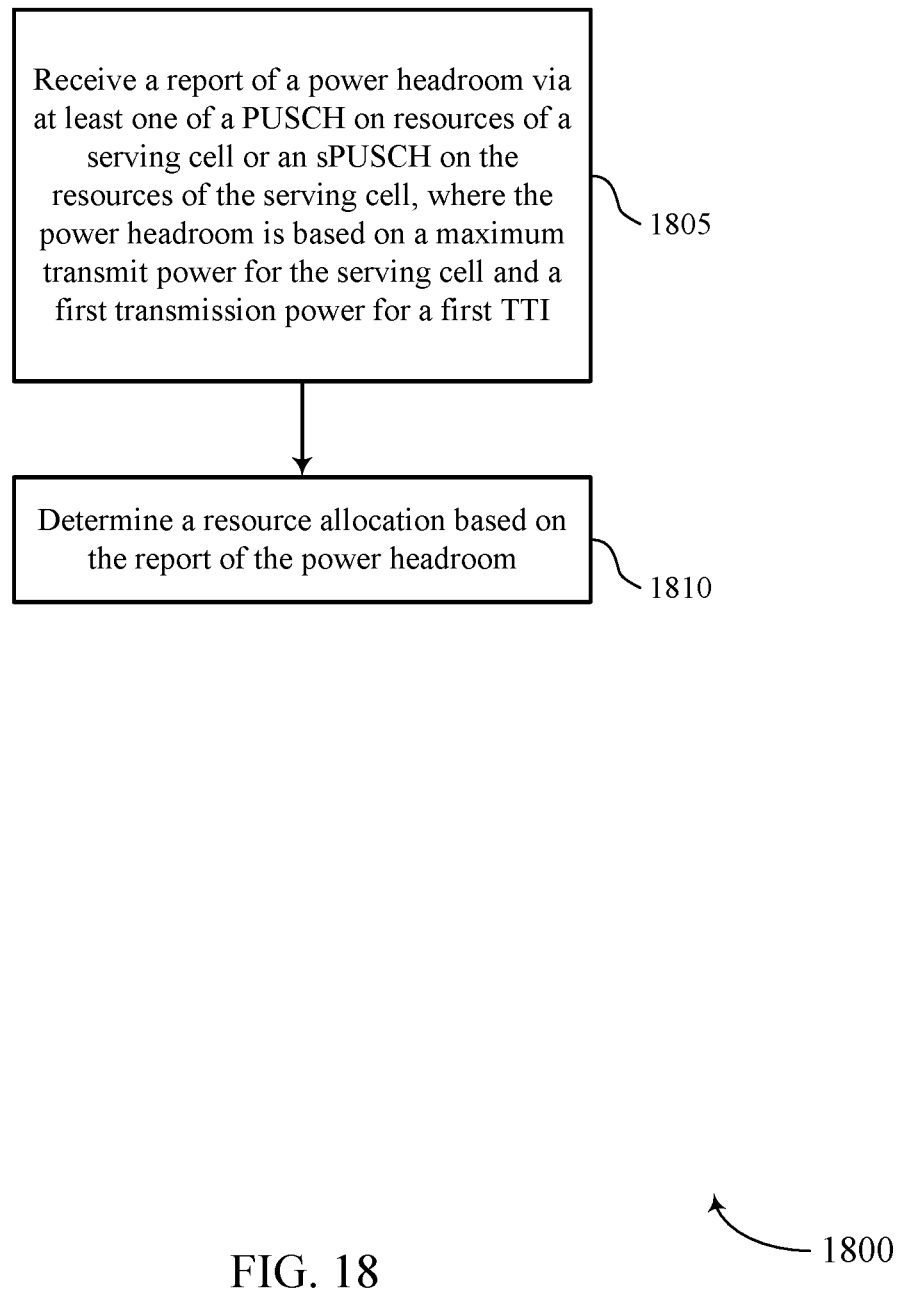

FIG. 18 shows a flowchart illustrating a method 1800 for power headroom reporting for systems with multiple TTIs in accordance with various aspects of the present disclosure. The operations of method 1800 may be implemented by a base station 105 or its components as described herein. For example, the operations of method 1800 may be performed by a base station TTI manager as described with reference to FIGS. 10 through 13. Accordingly, method 1800 may be an example of operations in a system that supports a first TTI duration and a second TTI duration, where the second TTI duration is longer than the first TTI duration. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may receive a report of a power headroom via at least one of a PUSCH on resources of a serving cell or an sPUSCH on the resources of the serving cell, wherein the power headroom is based at least in part on a maximum transmission power for the serving cell and a first transmission power for a first TTI. The operations of 1805 may be performed according to the methods described with reference to FIGS. 1 through 4. In certain examples, aspects of the operations of 1805 may be performed by a power headroom report component as described with reference to FIGS. 10 through 13.

At 1810 the base station 105 may determine a resource allocation based at least in part on the report of the power headroom. The operations of 1810 may be performed according to the methods described with reference to FIGS. 1 through 4. In certain examples, aspects of the operations of 1810 may be performed by a resource allocation component as described with reference to FIGS. 10 through 13.

Figure 19:
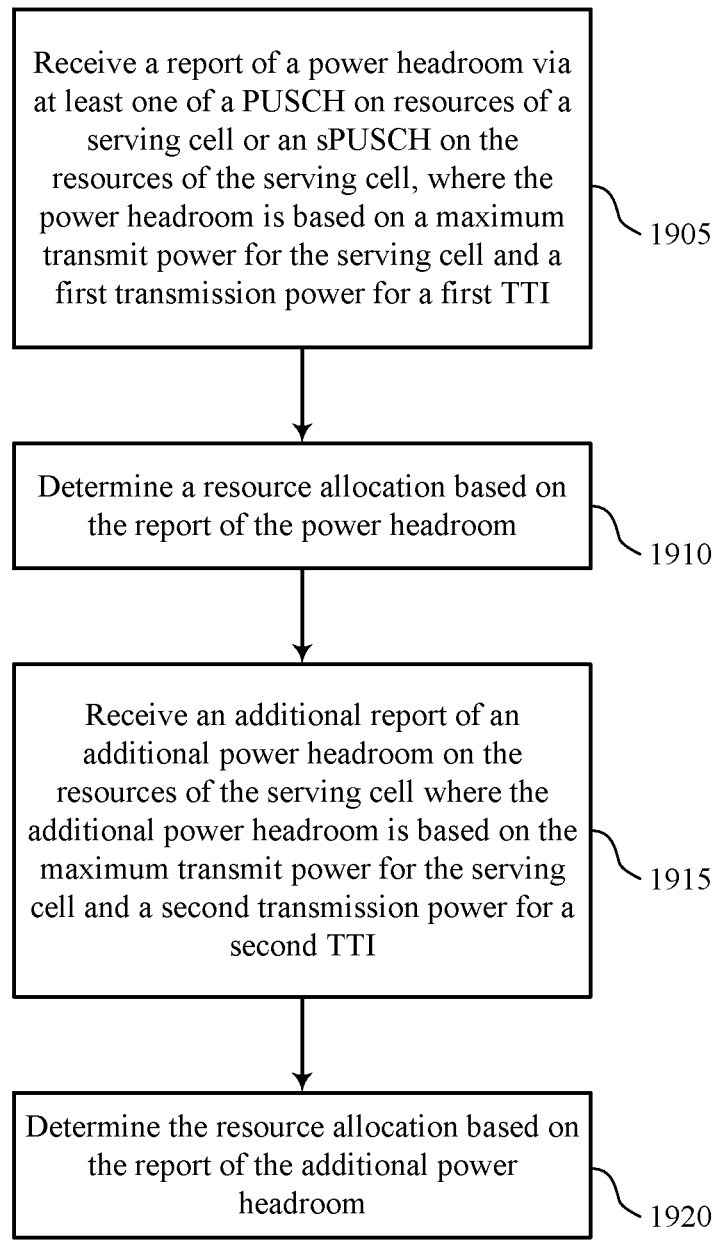

FIG. 19 shows a flowchart illustrating a method 1900 for power headroom reporting for systems with multiple TTIs in accordance with various aspects of the present disclosure. The operations of method 1900 may be implemented by a base station 105 or its components as described herein. For example, the operations of method 1900 may be performed by a base station TTI manager as described with reference to FIGS. 10 through 13. Accordingly, method 1900 may be an example of operations in a system that supports a first TTI duration and a second TTI duration, where the second TTI duration is longer than the first TTI duration. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may receive a report of a power headroom via at least one of a PUSCH on resources of a serving cell or an sPUSCH on the resources of the serving cell, wherein the power headroom is based at least in part on a maximum transmission power for the serving cell and a first transmission power for a first TTI. The operations of 1905 may be performed according to the methods described with reference to FIGS. 1 through 4. In certain examples, aspects of the operations of 1905 may be performed by a power headroom report component as described with reference to FIGS. 10 through 13.

At 1910 the base station 105 may determine a resource allocation based at least in part on the report of the power headroom. The operations of 1910 may be performed according to the methods described with reference to FIGS. 1 through 4. In certain examples, aspects of the operations of 1910 may be performed by a resource allocation component as described with reference to FIGS. 10 through 13.

At 1915 the base station 105 may receive an additional report of an additional power headroom on the resources of the serving cell wherein the additional power headroom is based at least in part on the maximum transmission power for the serving cell and a second transmission power for a second TTI. The operations of 1915 may be performed according to the methods described with reference to FIGS. 1 through 4. In certain examples, aspects of the operations of 1915 may be performed by a power headroom report component as described with reference to FIGS. 10 through 13.

At 1920 the base station 105 may determine the resource allocation based at least in part on the report of the additional power headroom. The operations of 1920 may be performed according to the methods described with reference to FIGS. 1 through 4. In certain examples, aspects of the operations of 1920 may be performed by a resource allocation component as described with reference to FIGS. 10 through 13.

In some examples, aspects from two or more of the methods 1400, 1500, 1600, 1700, 1800 or 1900 described with reference to FIG. 14, 15, 16, 17, 18 or 19 may be combined. It should be noted that the methods 1400, 1500, 1600, 1700, 1800, or 1900 are just example implementations, and that the operations of the methods 1400, 1500, 1600, 1700, 1800, or 1900 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA) or the like. CDMA2000 covers IS-2000, IS-95, and IS-856 standards. IS-2000 Releases may be commonly referred to as CDMA2000 1x, 1x. IS-856 (TIA-856) is commonly referred to as CDMA2000 1xEV-DO, High Rate Packet Data (HRPD), or the like. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB, or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," "component," and the like may not be a substitute for the word "means." As such, no claim element is to be construed as a means plus function unless the element is expressly recited using the phrase "means for."

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication in a system that supports a first transmission time interval (TTI) duration and a second TTI duration that is longer than the first TTI duration, comprising:
    identifying a first transmission power for a first TTI of the first TTI duration;
    identifying a second transmission power for a second TTI of the second TTI duration;
    determining a first power headroom based at least in part on a maximum transmission power for a serving cell and the first transmission power for the first TTI;
    determining a second power headroom based at least in part on the second transmission power for the second TTI; and
    transmitting a report of a combined power headroom using at least one of a physical uplink shared channel (PUSCH) on resources of the serving cell or a short PUSCH (sPUSCH) on the resources of the serving cell, wherein the combined power headroom comprises a sum of the first power headroom and the second power headroom.

2. The method of claim 1, wherein the combined power headroom is determined based at least in part on the first transmission power for the first TTI and the second transmission power for the second TTI.

3. The method of claim 2, further comprising:
    receiving a transmit power control (TPC) command in a grant of resources for a set of TTIs of the first TTI duration that overlaps in time with the second TTI of the second TTI duration, wherein the combined power headroom is determined based at least in part on the TPC command and the combined power headroom is associated with each TTI in the set of TTIs.

4. The method of claim 3, further comprising:
    determining that a report of a power headroom for the first TTI of the first TTI duration or the second TTI of the second TTI duration is due, wherein the report of the combined power headroom is transmitted based at least in part on the determination that the report for the first TTI or the second TTI is due.

5. The method of claim 2, further comprising:

receiving a transmit power control (TPC) command associated with the first TTI of the first TTI duration, wherein the combined power headroom is determined based at least in part on the TPC command.

6. The method of claim 5, further comprising:

determining that a report for the first power headroom for the first TTI of the first TTI duration is due, wherein the report for the combined power headroom is transmitted based at least in part on the determination that the report is due for the first TTI.

7. The method of claim 5, further comprising:

determining that a report for the second power headroom for the second TTI of the second TTI duration is due, wherein the report for the combined power headroom is transmitted based at least in part on the determination that the report is due for the second TTI.

8. The method of claim 7, wherein:

a set of TTIs of the first TTI duration overlaps in time with the second TTI, the set of TTIs comprises the first TTI; and the combined power headroom is determined based at least in part on a maximum power headroom or an average power headroom for TTIs of the set of TTIs.

9. The method of claim 7, wherein:

a set of TTIs of the first TTI duration overlaps in time with the second TTI; and the first TTI comprises an initial TTI scheduled from the set of TTIs.

10. The method of claim 7, wherein:

a set of TTIs of the first TTI duration overlaps in time with the second TTI;

the set of TTIs comprises the first TTI; and the report of the combined power headroom comprises a value that indicates an index of the first TTI.

* * * * *